(12) United States Patent
Chan et al.

(10) Patent No.: US 9,853,324 B2
(45) Date of Patent: Dec. 26, 2017

(54) NANOWIRE-BASED SOLID ELECTROLYTES AND LITHIUM-ION BATTERIES INCLUDING THE SAME

(71) Applicants: Candace Chan, Phoenix, AZ (US); Ting Yang, Tempe, AZ (US); Ying Li, Tempe, AZ (US)

(72) Inventors: Candace Chan, Phoenix, AZ (US); Ting Yang, Tempe, AZ (US); Ying Li, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 46 days.

(21) Appl. No.: 14/917,702

(22) PCT Filed: Sep. 11, 2014

(86) PCT No.: PCT/US2014/055130
§ 371 (c)(1),
(2) Date: Mar. 9, 2016

(87) PCT Pub. No.: WO2015/038735
PCT Pub. Date: Mar. 19, 2015

(65) Prior Publication Data
US 2016/0248118 A1    Aug. 25, 2016

Related U.S. Application Data

(60) Provisional application No. 61/876,424, filed on Sep. 11, 2013.

(51) Int. Cl.
*H01M 10/0562*    (2010.01)
*H01M 10/0525*    (2010.01)
(Continued)

(52) U.S. Cl.
CPC ...... *H01M 10/0562* (2013.01); *D01D 5/0015* (2013.01); *H01M 4/136* (2013.01);
(Continued)

(58) Field of Classification Search
CPC ............. H01M 10/0562; H01M 4/136; H01M 4/5825; H01M 10/0525; H01M 10/058;
(Continued)

(56) References Cited

U.S. PATENT DOCUMENTS

| 6,423,453 B1 | 7/2002 | Noda | |
|---|---|---|---|
| 2009/0214956 A1* | 8/2009 | Prieto | H01M 4/0404 429/310 |

(Continued)

FOREIGN PATENT DOCUMENTS

| WO | WO/2011/127218 | 10/2011 |
|---|---|---|
| WO | WO/2011/156419 | 12/2011 |
| WO | WO/2012/105901 | 9/2012 |

OTHER PUBLICATIONS

International Search Report for PCT Application No. PCT/US2014/055130, dated Dec. 22, 2014, 2 pages.
(Continued)

*Primary Examiner* — Stewart Fraser
(74) *Attorney, Agent, or Firm* — Fish & Richardson P.C.

(57) ABSTRACT

A solid electrolyte for a lithium-ion battery including a film having a multiplicity of nanowires, each nanowire including a lithium-ion conductive material, and a lithium-ion battery including the solid electrolyte. The multiplicity of nanowires may be formed in an electrospinning process. The lithium-ion battery may be formed by compressing the solid electrolyte between an anode layer and a cathode layer.

22 Claims, 22 Drawing Sheets

300

(51) Int. Cl.
*H01M 10/058* (2010.01)
*H01M 10/0585* (2010.01)
*D01D 5/00* (2006.01)
*H01M 4/136* (2010.01)
*H01M 4/58* (2010.01)
*H01M 4/02* (2006.01)

(52) U.S. Cl.
CPC ....... *H01M 4/5825* (2013.01); *H01M 10/058* (2013.01); *H01M 10/0525* (2013.01); *H01M 10/0585* (2013.01); *H01M 2004/028* (2013.01); *H01M 2300/0071* (2013.01)

(58) Field of Classification Search
CPC ....... H01M 10/0585; H01M 2004/028; H01M 2300/0071; D01D 5/0015
See application file for complete search history.

(56) References Cited

U.S. PATENT DOCUMENTS

| | | | |
|---|---|---|---|
| 2010/0330421 A1* | 12/2010 | Cui | H01M 4/134 429/217 |
| 2011/0229759 A1* | 9/2011 | Yazami | H01M 4/0402 429/213 |
| 2013/0052762 A1* | 2/2013 | Li | B82Y 10/00 438/22 |
| 2013/0078508 A1* | 3/2013 | Tolbert | H01M 4/134 429/188 |

OTHER PUBLICATIONS

Written Opinion of the International Searching Authority for PCT Application No. PCT/US2014/055130, dated Dec. 22, 2014, 4 pages.

* cited by examiner

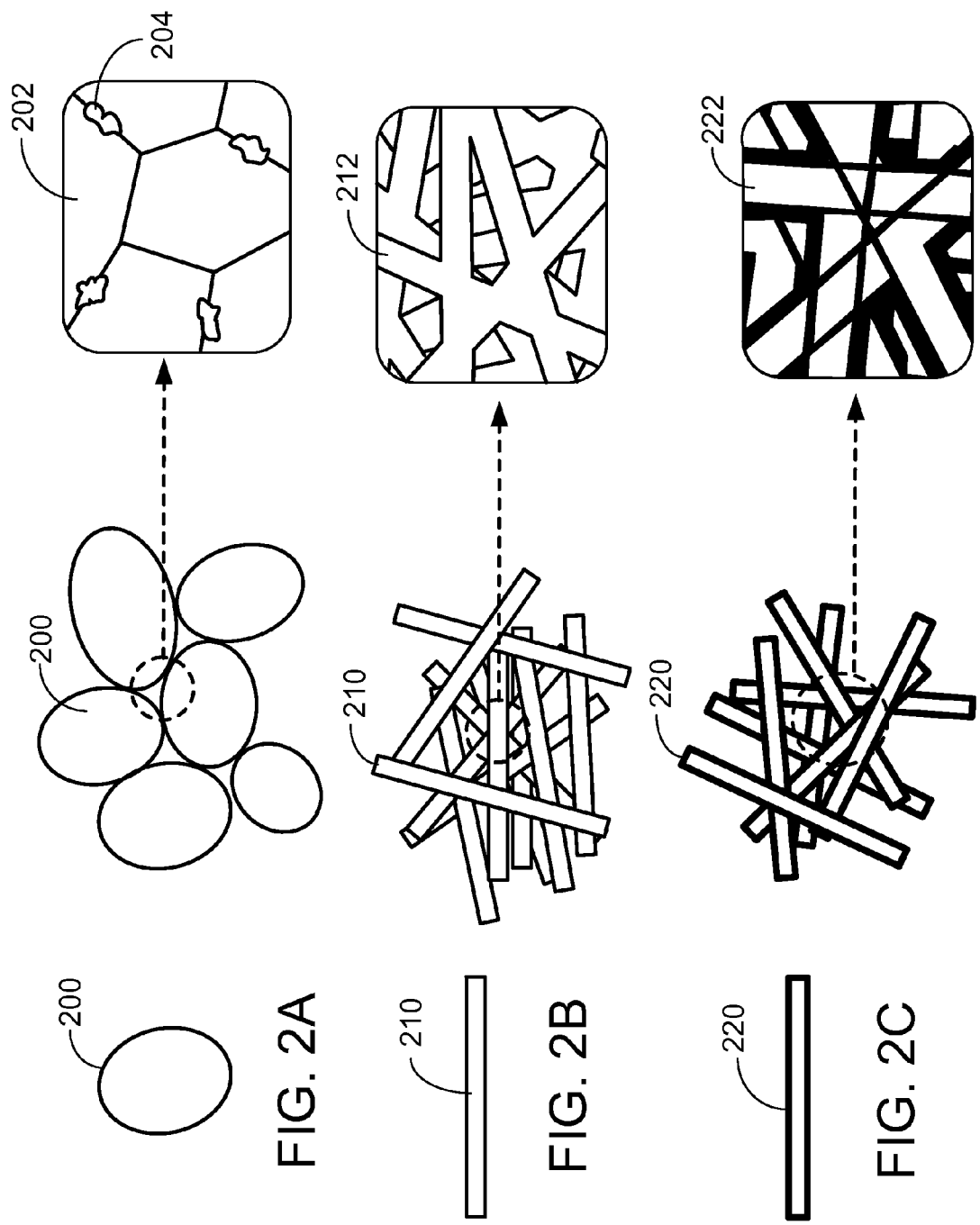

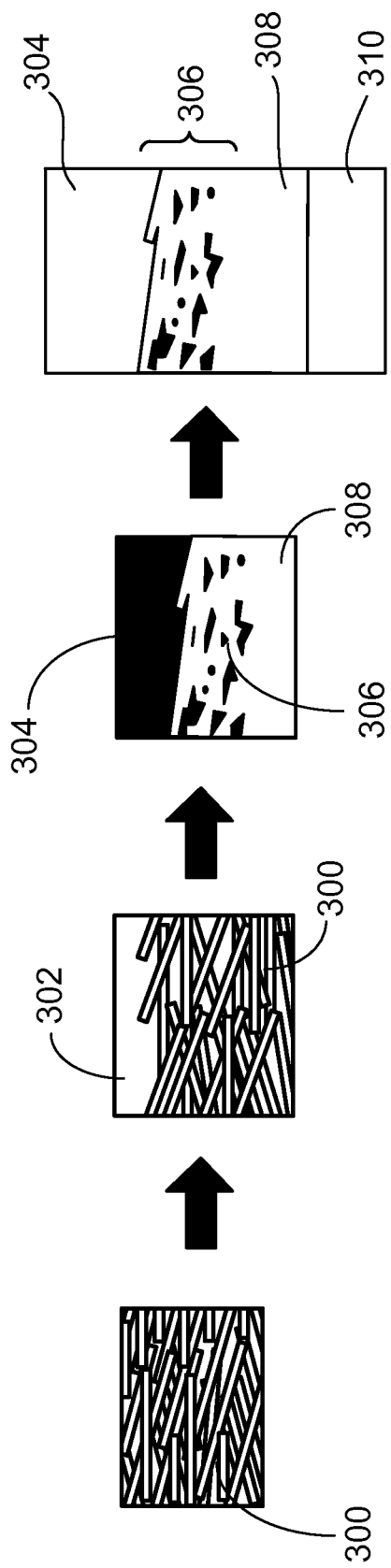

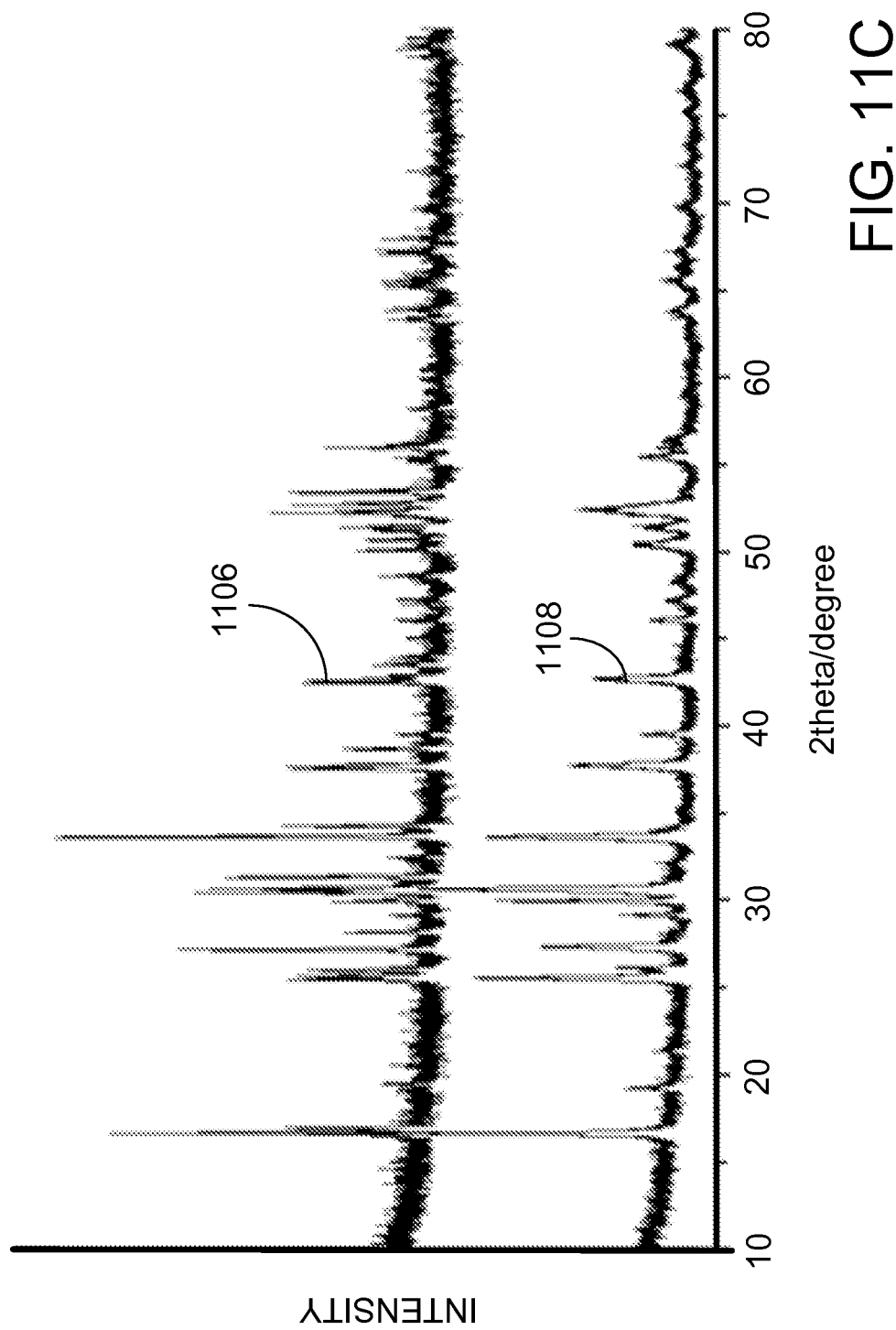

NANOWIRE-BASED SOLID ELECTROLYTES AND LITHIUM-ION BATTERIES INCLUDING THE SAME

CROSS-REFERENCE TO RELATED APPLICATIONS

This application is a U.S. National Phase Application of International Patent Application No. PCT/US2014/055130, filed on Sep. 11, 2014, entitled "NANOWIRE-BASED SOLID ELECTROLYTES AND LITHIUM-ION BATTERIES INCLUDING THE SAME" which claims priority to U.S. Provisional Patent Application Ser. No. 61/876,424 entitled "NANOWIRE-BASED SOLID ELECTROLYTES AND LITHIUM-ION BATTERIES INCLUDING THE SAME" filed on Sep. 11, 2013, both of which are incorporated by reference herein in their entirety.

TECHNICAL FIELD

This disclosure relates to nanowire-based solid electrolytes for lithium-ion batteries and lithium-ion batteries including the same.

BACKGROUND

When exposed to abuse from high temperatures, overcharging, or short-circuits, lithium-ion batteries can catch fire and explode. The flammable nature and low flashpoints of the organic carbonate-based solvents comprising the electrolyte make carbon anodes soaked in electrolyte vulnerable to self-heating at temperatures as low as 50° C. Furthermore, the most common electrolyte salt, lithium hexafluorophosphate ($LiPF_6$), has poor stability at elevated temperatures and can autocatalyze the decomposition of the electrolyte solvent. Several high profile incidents resulting from lithium-ion battery overheating and fire, including the recalls of millions of laptop batteries as well as electric cars, illustrate that lithium-ion battery failures can present a high risk of economic loss.

In terms of engineering controls for battery safety, several strategies exist at the system (e.g., vehicle) level, module/pack level, and at the cell level that revolve around management or prevention of decomposition of the organic liquid electrolyte. These include thermal management strategies such as liquid or air cooling; battery management systems for careful voltage, current, and temperature control, and cell level controls such as cell venting and shut down separators. Electrolyte additives that serve as internal controls have also been investigated. Flame retardant additives decrease the flammability of the liquid electrolyte, but can increase the electrochemical instability or viscosity of the liquid electrolyte, leading to lower energy capacity and power characteristics, and representing a significant portion of the battery costs.

The ionic conductivity of the most common liquid electrolyte, 1 M $LiPF_6$ in ethylene carbonate/diethylene carbonate (EC-DEC) solvent exceeds that of several alternatives. However, liquid electrolytes typically require a microporous polymer separator (e.g., CELGARD®) to prevent the anode and cathode from touching, while allowing liquid electrolyte transport through the pores. The separators can be 20% of the total battery cost and their mechanical properties are crucial to its safety. Existing polymer separators undergo structural changes and thermal shrinkage at elevated temperatures (~100° C.), can be easily punctured by lithium dendrites (which may short circuit the cell), and can suffer from creep-induced pore closure due to mechanical stresses on the battery or from the electrode volume changes during lithiation/delithiation.

FIG. 1A depicts lithium-ion battery (LIB) 100 with a liquid electrolyte. Lithium-ion battery 100 includes anode 102 and cathode 104. Anode 102 and cathode 104 are separated by separator 106. Anode 102 includes anode collector 108 and anode material 110 in contact with the anode collector. Cathode 104 includes cathode collector 112 and cathode material 114 in contact with the cathode collector. Electrolyte 116 is in contact with anode material 110 and cathode material 114. Anode collector 108 and cathode collector 112 are electrically coupled via closed external circuit 118. Anode material 110 and cathode material 114 are materials into which, and from which, lithium ions 120 can migrate. During insertion (or intercalation) lithium ions move into the electrode (anode or cathode) material. During extraction (or deintercalation), the reverse process, lithium ions move out of the electrode (anode or cathode) material. When a LIB is discharging, lithium ions are extracted from the anode material and inserted into the cathode material. When the cell is charging, lithium ions are extracted from the cathode material and inserted into the anode material. The arrows in FIG. 1A depict movement of lithium ions through separator 106 during charging and discharging.

When electrolyte 116 is a liquid electrolyte, separator 106 is typically a polymer separator, such as CELGARD®. Inorganic separators have also been used. Lithium-ion batteries with inorganic separators (e.g., SEPARION® ceramic separators), however, still typically require flammable liquid electrolytes, since they are generally composed of oxides (e.g. $Al_2O_3$) that do not conduct Li ions.

Alternatives to liquid electrolytes generally suffer from mechanical, electrochemical, or other shortcomings that typically make them impractical. For example, solid electrolyte alternatives with high $Li^+$ ionic conductivity and intrinsic thermal stability have been identified; however, current methods of materials synthesis are incapable of supplying solid electrolytes with the strength and flexibility required for commercial scale production.

FIG. 1B depicts lithium-ion battery 150 with anode 102, anode collector 108, cathode 104, cathode collector 112, and solid state electrolyte 152. When LIB 150 is discharging, lithium ions are extracted from the anode material and inserted into the cathode material. When the cell is charging, lithium ions are extracted from the cathode material and inserted into the anode material. The arrows in FIG. 1B depict movement of lithium ions through solid state electrolyte 152 during charging and discharging.

SUMMARY

The present disclosure describes a solid electrolyte for a lithium-ion battery, and lithium-ion batteries including the same.

A first general aspect includes a solid electrolyte for a lithium-ion battery, the solid electrolyte including a film having a multiplicity of nanowires, each nanowire including a lithium-ion conductive material.

A second general aspect includes a lithium-ion battery including the solid electrolyte of the first general aspect.

A third general aspect includes forming a film comprising lithium-ion-conductive nanowires to yield a solid electrolyte for a lithium-ion battery.

A fourth general aspect includes fabricating a lithium-ion battery by a process including compressing a solid electrolyte of the first general aspect between an anode layer and a cathode layer.

A fifth general aspect includes a lithium-ion battery fabricated by the process of the fourth general aspect.

Implementations of these general aspects may include one or more of the following features.

In some cases, the film has a thickness ranging from 100 nm to 1 mm. The nanowires may be amorphous, crystalline, or any combination thereof. The multiplicity of nanowires may be aligned or randomly oriented in the film. The film may include an additive. In some cases, the film includes a multiplicity of electrospun nanowires.

The lithium-ion conductive material may be an oxide including lithium. In some cases, the oxide including lithium is a perovskite or a garnet-like oxide. An exemplary perovskite may include lanthanum and titanium. In certain cases, a perovskite has a stoichiometry of $Li_{3x}La_{2/3-x}\square_{1/3-2x}TiO_3$, where $\square$ represents the vacancies and $0<x<0.16$. The perovskite may include $Li_{0.3}La_{0.56}TiO_3$. A garnet-like oxide may have a stoichiometry of $Li_xLa_3M_2O_{12}$ (M=Ta, Nb, Zr) or $Li_6ALa_2M_2O_{12}$ (A=Ca, Sr, Ba; M=Nb, Ta). In some case, the garnet-like oxide includes $Li_2La_3Zr_2O_{12}$. Another example of an oxide including lithium is $LiNbO_3$.

The lithium-ion battery of any of the above general aspects may further include an anode and a cathode, with the film in direct contact with the anode and the cathode.

In any of the above general aspects, forming the film including lithium-ion-conductive nanowires may include electrospinning a precursor solution including nanowires to yield the film.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A depicts sintering in spherical particles, where coalescence occurs during high temperature calcination and impurity phases can form at grain boundaries. FIG. 2B depicts sintering in anisotropic particles such as nanowires. FIG. 2C depicts sintering in core-shell nanowires.

FIGS. 3A-3D depict fabrication of electrolyte/cathode composites using core-shell nanowire films derived from $Li_2La_3Zr_2O_{12}$ (LLZO) nanowires and $LiCoO_2$ (LCO) sol-gel.

FIG. 11C shows a comparison between calcined bulk LLZO and calcined electrospun LLZO nanowires.

DETAILED DESCRIPTION

Figure 1A:
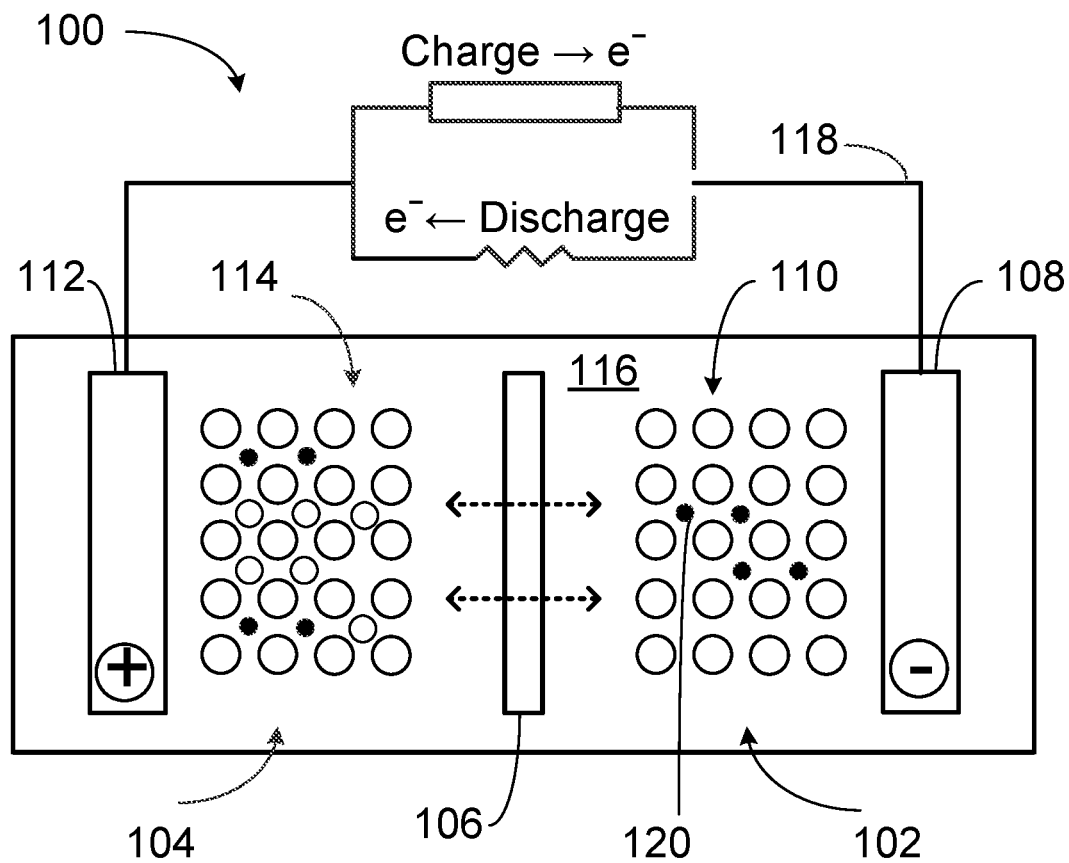
FIG. 1A depicts a lithium-ion battery with a liquid electrolyte.
Figure 1B:
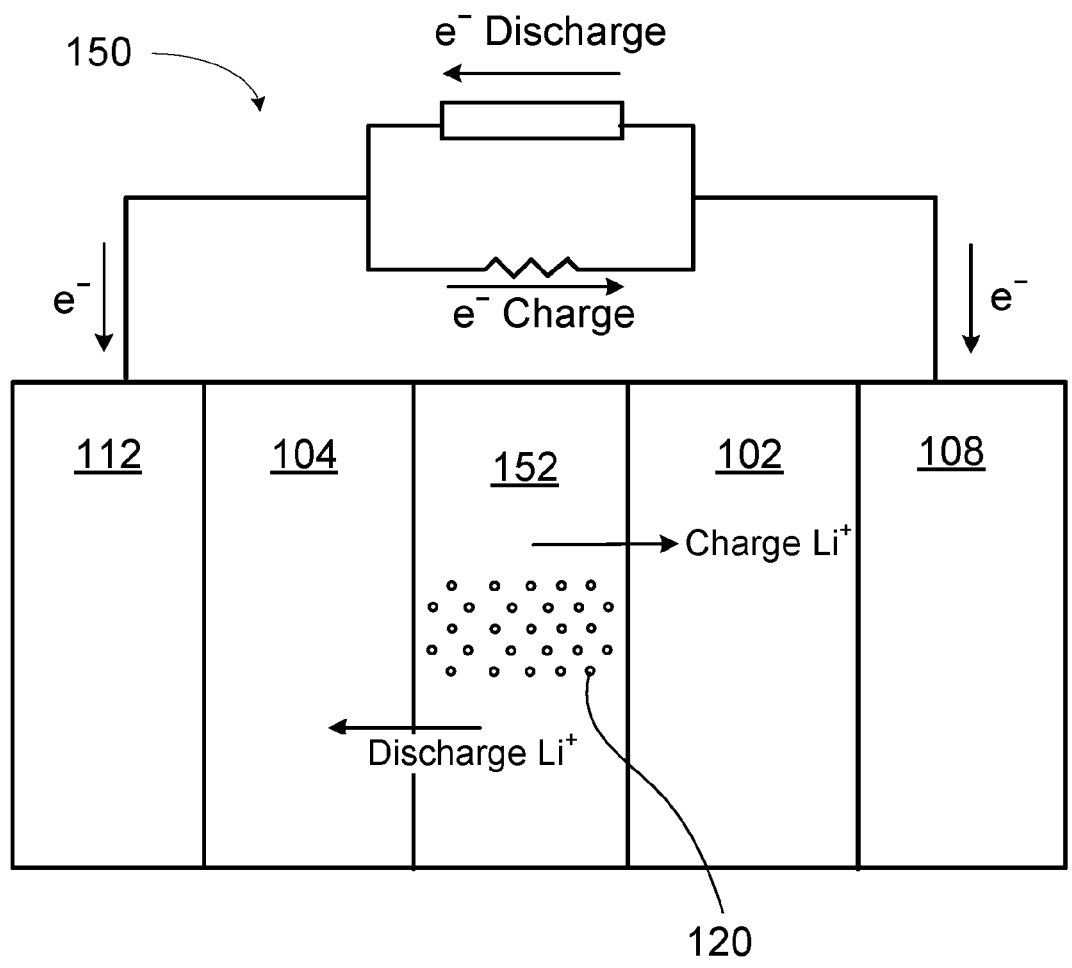
FIG. 1B depicts a lithium-ion battery with a solid state electrolyte.

Suitable lithium-ion conductors for the solid electrolytes described herein include metal oxides and other solid electrolytes, such as sulfides, phosphates, and polymers (e.g., solid polymers that contain lithium salt). Examples of suitable metal oxides include metal oxides with perovskite or garnet structures. Amorphous $LiNbO_3$ has an ionic conductivity of about $10^{-4}$ S/cm at room temperature. $LiNbO_3$ has high grain boundary conductivity and low bulk crystalline conductivity. One example of a perovskite is $(Li,La)TiO_3$ (LLTO), having an ionic conductivity greater than $10^{-3}$ S/cm at room temperature. LLTO has a stoichiometry of $Li_{3x}La_{2/3-x}\square_{1/3-2x}TiO_3$ where $\square$ represents the vacancies and $0<x<0.16$. An example of LLTO is $Li_{0.3}La_{0.56}TiO_3$. LLTO has low grain boundary conductivity and high bulk crystalline conductivity. Amorphous LLTO is stable in contact with Li metal. Garnet-like oxide lithium-ion conductors have the general formula $Li_xLa_3M_2O_{12}$ (M=Ta, Nb, Zr) or $Li_6ALa_2M_2O_{12}$ (A=Ca, Sr, Ba; M=Nb, Ta), and an ionic conductivity of about $10^{-4}$ S/cm at room temperature.

One example of garnet-like oxide is $Li_2La_3Zr_2O_{12}$ (LLZO). LLZO has comparable bulk and grain boundary resistances and is stable in the presence of low voltage anodes.

Solid electrolytes described herein include nonwoven nanowire films including ceramic lithium-ion-conducting nanowires. The morphology of the nanowires provides nano-interfaces and also promotes transport over long distances. As used herein, "nanowire" generally refers to a high aspect ratio structure having thickness or diameter in a range from 1 nm to 500 nm and an unconstrained length, typically in a range from 1 μm to 50 μm. The nanowires may be single crystalline, polycrystalline, or amorphous, including amorphous shell, crystalline core nanowires and crystalline shell, amorphous core nanowires with various core and shell thicknesses. Nanowires may also include high aspect ratio structures such as nanorods, nanofibers, and the like. As used herein, "film" generally refers to a layer of material having a thickness in a range between 100 nm to 1 mm in thickness. Nanowires in a film may be randomly oriented or aligned in any manner.

Solid electrolytes with nanowire morphology can display decreased crystallization and sintering temperatures and times, as well as improved compositional and structural uniformity and control of grain sizes. Many ceramic solid electrolytes are prepared using solid state reaction and require high calcination temperatures and long times to obtain the suitable crystal structure. For example, LLZO is conventionally made using solid state reaction from LiOH, $La_2O_3$, and $ZrO_2$, requiring high temperatures (>1180° C.) and long times (e.g., 36 h) to obtain the desired cubic phase. Incompletely reacted intermediates or impurity phases such as $Li_6Zr_2O_7$ and $Li_2ZrO_3$, which have significantly lower ionic conductivity than LLZO, can accumulate on grain boundaries, block $Li^+$ transport, and create large grain boundary resistances. On the other hand, long calcination times can lead to $Li^+$ loss and the formation of $La_2Zr_2O_7$, which has no $Li^+$ conductivity.

Because nanomaterials have high surface to volume ratios, impurities that contribute to ion blocking at grain boundaries are diluted and less likely to form precipitates. Furthermore, the high surface area and shorter mass transport distances in nanomaterials allow for calcination at lower temperatures and for shorter times compared to bulk materials. This could lead to less $Li^+$ loss and compositional or structural inhomogeneity, which would result in better ionic conductivity in the nanowire solid electrolytes compared to bulk morphologies.

Solid electrolyte nanowires can also show improved sintering properties compared to spherical bulk powders or nanopowders due to better packing efficiency, enhanced plastic deformation under uniaxial pressing, and high amounts of surface defects such as vacancies, which can accelerate mass and energy transfer between reactants. As a result of these properties, films or pellets derived from nanowires can display higher densities and require milder conditions for sintering compared to bulk materials.

The solid electrolyte nanowires can also show improved phase stability compared to bulk powders. This may be important for stabilizing non-equilibrium or metastable phases that display better ionic transport properties. For example, tetragonal phase LLZO has 2-3 orders of magnitude lower ionic conductivity than the cubic phase obtained >1180° C. A common strategy for improving the conductivity of LLZO is to add extrinsic dopants to stabilize the cubic phase at room temperature. Example dopants include $Al^{3+}$, which was first introduced inadvertently from the crucible used during sintering, or Zr substitution by Ta or Nb. In many cases these dopants can impede $Li^+$ transport if present at high concentrations by blocking $Li^+$ migration pathways and forming non-conducting impurity phases such as $LaAlO_3$. Additionally, concentrations of dopants such as Ta and Nb must be carefully controlled, since there is a narrow composition range for peak conductivity.

On the other hand, many ceramic nanostructures can stabilize non-equilibrium phases without requiring dopants. The nano-sized materials can become stabilized from reduced surface free energy as a result of their high surface area. There is often a critical grain size for the stabilization of metastable phases, with the thermodynamic phase frequently predominating after sintering. However, the metastable phase can be retained using appropriate sintering methods that suppress grain growth while allowing for densification, such as hot-pressing, two-step sintering, spark plasma sintering, or template grain growth sintering. For instance, $TiO_2$ films with nanocrystalline grain size and metastable anatase structure can be obtained using hot-pressing. Similarly, the metastable, high conducting cubic phase of LLZO can be stabilized in nanowires without extrinsic dopants due to their lower surface energy. Stabilization from surface defects such as $Li^+$ vacancies may also be possible.

In some cases, a nonwoven nanowire film consists of nanowires in the form of a network. In certain cases, a nonwoven nanowire film includes nanowires in the form of a network and one or more additives such binders, fillers, conductivity enhancers, and the like.

A unique capability of nanowires is the ability to use core-shell configurations to obtain composite structures, whereby the solid electrolyte nanowires form the core of the composite and are coated with a shell material. Afterwards, sintering can be performed to create inter-wire contacts and coalescence. After sintering, the surfaces of the original core-shell nanowires become new phase boundaries with shells separating the formally distinct but adjacent nanowires. Sintering of bulk spherical particles 200, yielding sintered bulk particles 202 with impurity precipitates 204 is depicted in FIG. 2A. Sintering of nanowires 210 to yield sintered nanowires 212 is depicted in FIG. 2B, and sintering of core-shell nanowires 220 to yield sintered core-shell nanowires 222 is depicted in FIG. 2C. Due to the lower grain boundary area in sintered bulk particles, there is a higher tendency for impurities to segregate at the grain boundaries and form ion blocking precipitate phases. This is less likely to occur in sintered nanostructures.

The solid electrolyte core-shell composite structures have several advantages compared to conventional electrolytes. After sintering of the core-shell nanowires, the shell regions separate the formally distinct but adjacent nanowires and become new phase boundaries. The shells can serve as physical barriers to prevent grain boundary motion and grain growth in the core material, which could maintain nanocrystalline grain sizes or to stabilize metastable phases.

The core-shell configurations can also be used to obtain composite structures that exploit space-charge effects. The study of nano-size effects in solid state ionic transport has revealed that ionic conductivity can be drastically improved at interfaces, surfaces, and grain boundaries due to enhanced conduction through vacancies and space charge regions. A common way to exploit this phenomenon is to add a secondary, often non-conducting phase to the ionically conducting phase. This can be achieved by mixing conducting particles with non-conducting particles, or preparing multilayer structures with alternating thin film layers or conductors and non-conductors. In $Li^+$ conductors, fast $Li^+$ migration pathways can form at the interfaces between the two phases due to space charge effects, enhancing the overall ionic conductivity. However, if the secondary particles have no bulk $Li^+$ conductivity, the amount of secondary phase added to the composite must be carefully controlled. When preparing these composite electrolytes from bulk particles, the amount of surface area activated by these space charge effects can be quite small.

In the solid electrolyte core-shell composite structures, $Li^+$ transport can be improved from space charge effects at the interface between the core and the shell materials. The interface between the core and shell layers mimics that found in multilayer geometries and provides a long range interface. Such an interface is more difficult to achieve with particulate morphologies. The nanoscale diameter of the nanowires also provides a higher surface area than the 2D multilayers, which can maximize the area of the highly conducting space charge regions while minimizing inactive regions. Therefore, a solid electrolyte composed of these core-shell nanowires has the potential to improve the ionic conductivity by exploiting the nano-interfaces and promoting $Li^+$ transport over long distances.

Composite electrolytes can also lead to improved ionic conductivity through modification of the grain boundaries. For example, for LLZO, adding Al and Si dopants can result in the formation of $LiAlSiO_4$ (a moderate $Li^+$ conductor) at the grain boundaries, which can eliminate the grain boundary resistance to $Li^+$ conductivity, resulting in an improvement in the total LLZO conductivity. However, due to the spherical morphology of the grains, these activated areas are limited predominately to the triple point grain boundary regions. The composite approach can be used to uniformly modify LLZO grain boundaries by using a shell material that delivers dopants that can promote high $Li^+$ transport. Example dopants include Al, Si, B, Zr, Ta, Nb, Sc, Ba, Nd, Te, Ga, Bi, Hf, Y, Gd, Tb, Eu, Lu, In, Mg, Ca, Sn, Sb, and W. Since the nanowire surfaces become boundaries after sintering, the grain boundaries can be effectively and more uniformly engineered in the desired manner using this method. Furthermore, the dopant concentration can be tuned by varying the ratio of the core diameter to the shell thickness.

Additionally, the core-shell composite structure can also be exploited to create an intimate interface between the electrolyte and cathode of the all-solid-state battery by using a cathode material as the shell. Integrating electrolytes into all-solid-state batteries, which typically consist of a metal oxide or polyanion cathode (such as $LiCoO_2$, $LiMn_2O_4$, or $LiFePO_4$) and a Li metal anode, is challenging because of interdiffusion of transition metal cations across the solid electrolyte-cathode interface or void formation at the interface during sintering. Since solid electrolyte nanowires demonstrate high packing efficiency and can crystallize and sinter at lower temperatures than bulk electrolyte, the nanowires will display superior properties when co-sintered with a cathode. The electrolyte/cathode composite can be achieved, for example, by infiltrating the solid electrolyte nanowire porous films with a cathode sol-gel precursor. Then, co-sintering of the solid electrolyte/cathode composite will be used to crystallize the cathode and densify the films. The full battery is then obtained by adding more cathode and pressing the solid electrolyte surface against Li foil. This process is depicted in FIGS. 3A-3D. FIG. 3A depicts LLZO nanowires 300. FIG. 3B depicts $LiCoO_2$ (LCO) sol-gel 302 as applied to a surface of LLZO nanowires 300. Sintering yields LCO cathode 304, LLZO/LCO composite 306, and LLZO electrolyte 308, as depicted in FIG. 3C. FIG. 3D depicts LCO cathode 304, LLZO/LCO composite 306, LLZO electrolyte 308, and anode 310.

The nanowire films are typically flexible, and have suitable ionic conductivity, chemical and thermal stability, and mechanical properties to replace both the liquid electrolyte and the separator typically present in lithium-ion batteries with a single material, thereby increasing the volumetric density of the battery while avoiding the safety hazards of liquid electrolytes and the brittleness and scaling problems that typically associated with solid electrolytes. Nanowire solid electrolytes can be assembled into films using casting and nano-papermaking techniques generally known in the art. The small dimensions of the nanowires and the strong interactions between nanowires assembled into a network can impart significant flexibility to the materials. In some cases, a solid electrolyte may include lithium-ion conducting nanowires disposed on nonwoven fiber supports. Accordingly, these fabrication methods allow large scale manufacturing of solid electrolytes for lithium-ion batteries.

Use of solid electrolyte nanowires also allows for exploitation of percolation networks. In any conducting medium, there is some onset of conductivity across a previously insulating region once enough conducting links have been added at a density that exceeds some critical value (i.e., the percolation threshold). Conventional solid electrolyte materials are spherical particles and can suffer from poor interparticle contacts and conducting pathways. Compared to spherical particles, the one-dimensional morphology of nanowires enables formation of networks that require less material to reach the percolation threshold.

Using nanowire conductors can decrease the thickness of the solid electrolyte required for a viable lithium-ion battery. For instance, a liquid electrolyte with ionic conductivity of 10 mS/cm and anode-cathode separation distance of 20 μm (the thickness of the polymer separator) has the same resistance as a 2 μm thickness of solid electrolyte with 1 mS/cm conductivity (keeping the cross-sectional area of the anode and cathode constant). This 2 μm thickness can be achieved using lithium lanthanum titanium oxide (LLTO) nanowire networks, since other synthesis methods for bulk LLTO (e.g. solid-state, sol-gel) result in micron-sized particles. Even if the LLTO nanowire network has a lower conductivity than bulk LLTO (e.g., 0.1 mS/cm), a 200 nm thick network can be used to compensate for conductivity losses while still remaining above the percolation threshold.

Replacing a separator with the nanowire solid electrolyte in a lithium-ion battery does not necessarily decrease the energy density since much thinner films can be used. For example, the mass of a CELGARD® separator with thickness of 25 μm is about 1.67 $mg/cm^2$ area. To maintain the same mass using solid electrolytes with ionic conductivity of 0.1-1 mS/cm, thicknesses of about 3 μm are needed, which is above the thickness needed for maximum conductivity as described herein. Hence these percolation concepts applied to nanowire solid electrolytes can lower the weight and volume of the battery, result in better utilization of space, and require fewer inactive materials.

Figures 4A, 4B, 4C:
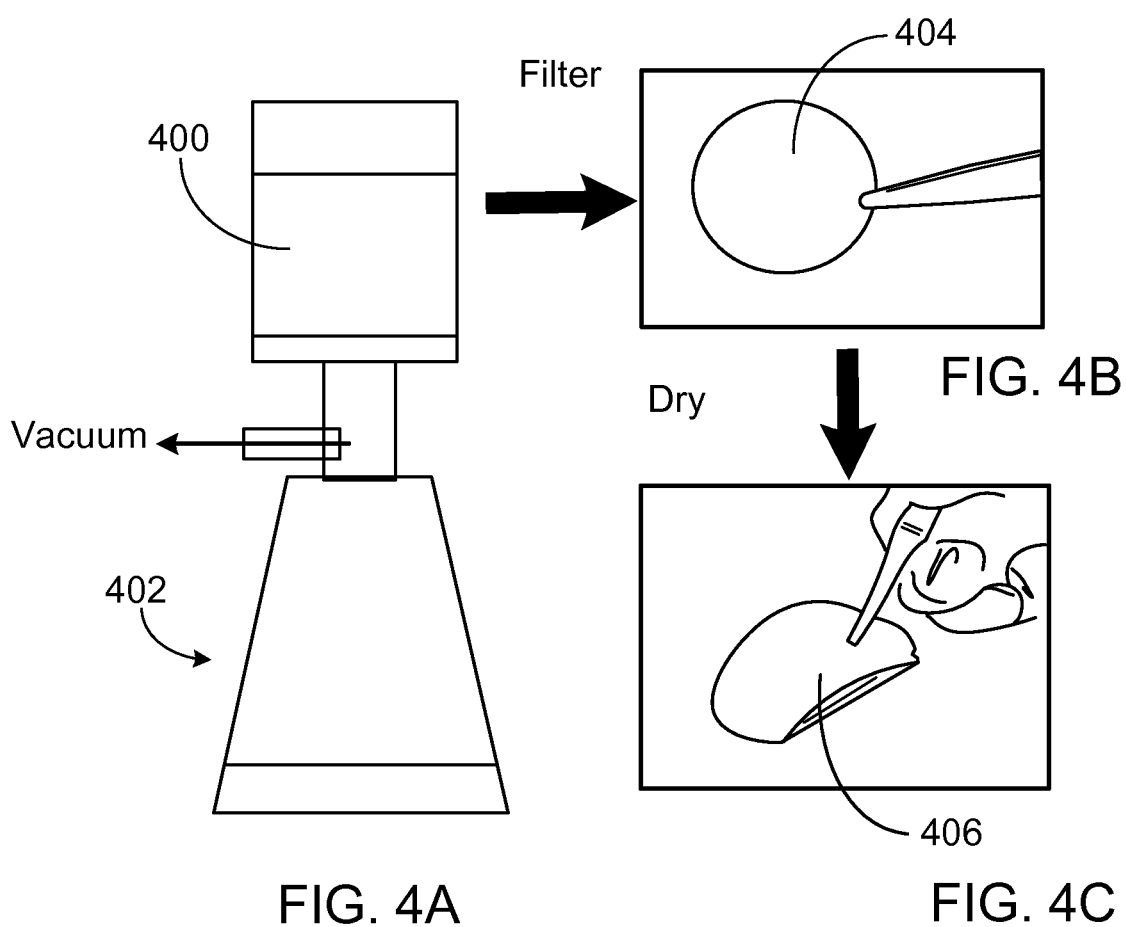
FIGS. 4A-4C depict the formation of a nonwoven nanowire film via vacuum filtration.

Different approaches may be used to obtain inorganic nanowires and core-shell nanowire structures on the laboratory scale. One method is to use chemical synthesis in the presence of a structure directing agent, such as a surfactant or polymer that promotes crystal growth along preferential directions. Another method is through hydrothermal reaction. One advantage of hydrothermal synthesis is that the resulting structures are single crystalline and nanowire morphologies are often obtained without needing additional structure directing agents. The nanowire diameter and length can be tuned by the synthesis conditions (e.g., temperature, reaction time, pH). Once the nanowires have been obtained, they can be processed into nonwoven films by fabrication methods including solvent-mediated evaporation, drop-casting, doctor blading, Meyer rod coating, spray-deposition, and may also be aligned using various methods including by shear, alignment in electric field or microfluidic channels, contact printing, etc. In one method, as depicted in FIGS. 4A-4C, a nonwoven nanowire film is formed via vacuum filtration of a nanowire-containing mixture 400 in vacuum apparatus 402, followed by removal of the nanowire-covered substrate 404 from the filter and drying of the resulting nonwoven nanowire film 406. In another method, nonwoven nanowire films are formed via self-organization during solvent evaporation, such as when a slurry of nanowires is dried in a trough. The films are typically free-standing and are held together by physically intermeshed nanowires and intermolecular forces in the absence of binders. In both vacuum filtration and electrospinning methods, a calcination step may be implemented to improve adhesion of the nanowires, to promote crystallization in the solid electrolyte, or both.

Figure 5:
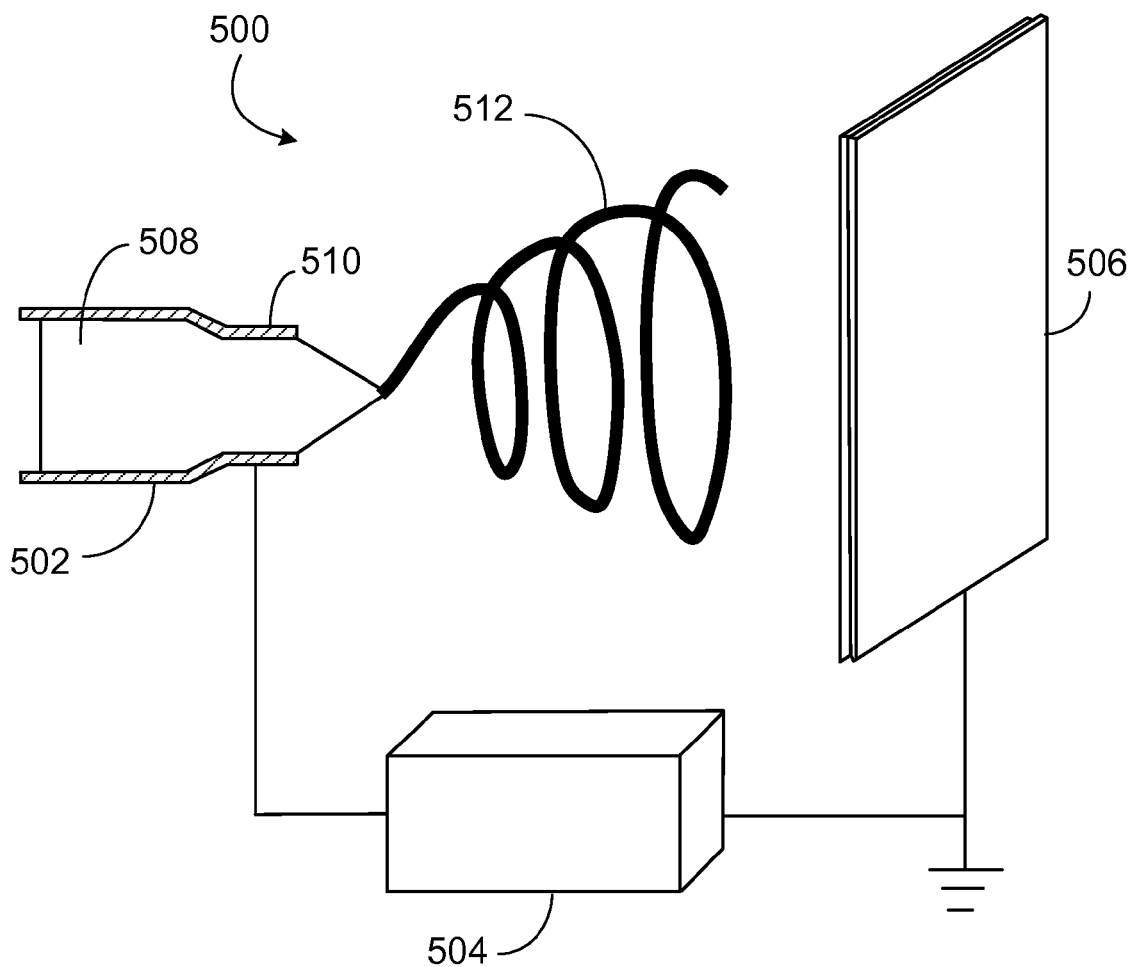
FIG. 5 depicts an electrospinning setup for synthesis of nanowires.

Large scale synthesis of nanowires or nanofibers may be achieved through electrospinning. Electrospinning is a technique for producing nanofibers, which was initially adopted by the textile industry to make polymer fibers. An example of an electrospinning setup 500 includes syringe pump with syringe 502, power supply 504, and metallic collector 506. This is shown schematically in FIG. 5. Fiber precursor solution 508 is placed inside syringe 502. The syringe is then loaded onto the pump and an electric field is applied between the needle tip 510 and collector 506. As the solution is pumped through the syringe, it will be pulled towards the collector as liquid jet 512 under the force exerted by the electric field. The solution is typically prepared with relatively high viscosity; therefore the droplets will become and elongated during the flight and eventually form into fibers as they reach the collector. For a stationary flat collector, the fibers are randomly stacked onto each other and form a non-woven mat. The mat can be peeled off from the collector and is usually very flexible and free-standing. When needed, it is also possible to deposit the fibers directly onto a desirable substrate and use them as a whole entity. It is also a common practice to electrospin multiple syringes simultaneously in order to increase the throughput, which also means that this process can be readily scaled-up for mass production.

An important step in synthesis of ceramic nanowires using electrospinning is the preparation of precursor solution, which generally includes a stable sol-gel and a polymer. To make oxide materials, several considerations should be taken into account when selecting the sol-gel reagents. For example, the sol-gel should be a homogeneous mixture of the reagents, and should be stable at least across the time span of the electrospinning process. Example sol-gel reagents for metal oxide materials include the alkoxides (e.g. propoxides, isopropoxide, butoxide, and the like) of the metals and salts (e.g. nitrate, acetate, chloride, and the like), as well as a solvent. Additionally there should be no undesired reaction in the sol-gel, such as hydrolysis, when the solution is exposed to the electric field. In some cases, an acid is introduced into the sol-gel to inhibit hydrolysis. The polymer should be compatible with the metal alkoxides or salts, and should have good solubility in the solvent. Typical solvents include acetone, methanol, ethanol, acetic acid, isopropanol, chloroform, dimethylformamide and water. It is also beneficial to have a polymer with long chains, which can provide sufficient viscosity to the solution and flexibility to the as-spun fibers. Example polymers include polyvinyl alcohol (PVA), polyvinylpyrrolidone (PVP), polyacrylonitrile (PAN), polymethylmethacrylate (PMMA), polyethylene glycol (PEG), polylactic acid (PLA) and polyvinylacetate (PVAc). The polymer can be added directly into the sol-gel, or can be dissolved in another solvent first with a concentration of 10-30 wt %, and then mixed with the sol. The sol and polymer solution can be mixed with a volume ratio of 3:1 or less. The same criteria for a stable sol-gel should also apply to the mixed precursor that contains the sol-gel, polymer, and solvent solution. The precursor preferably has sufficient viscosity so that it can be stretched into a continuous fiber without breaking or forming beads. A viscosity of 1-20 poise is generally feasible for producing a stable jet during electrospinning.

The accelerating voltage of the power supply should be in the range which leads to a stable jet at the needle tip, as well as continuous fibers at the collector. If the voltage is insufficient, dripping will occur at the tip and a stable jet cannot form. If the voltage is too high, the viscosity and surface tension of the precursor might not be large enough to counter balance the stretching force. Therefore, the fibers will experience breaking, resulting in non-uniform diameters. Or more severely, only beads will be collected instead of fibers. Typical accelerating voltage values are 5-40 kV.

The distance between the needle tip and the collector should be large enough to allow the solvents to evaporate and the fibers to be elongated. Typical distances between the needle tip and the collector are 5-20 cm. The electric field strength is typically maintained at a certain level, ensuring that the fibers can land onto the collector. Typical electric field values are 1-3 kV/cm.

The feed rate of the syringe pump should be adjusted to a range that is able to sustain a stable jet. Once a stable jet is established, the diameter of the as-spun fibers can be controlled by varying the feed rate within that range. Generally, a slower rate gives smaller diameter, and vice versa. Typical feed rates are between 0.1-20 mL/h.

Figure 6A:
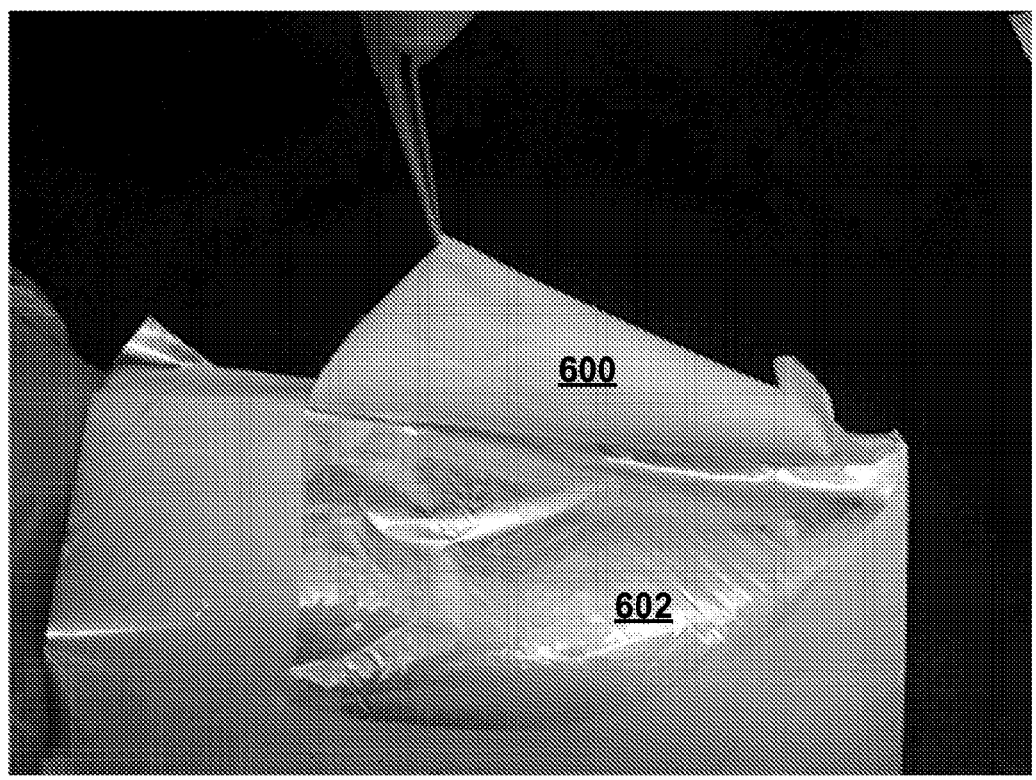
FIG. 6A shows as-spun polymer/sol-gel nanowires peeled off from the Al foil collector.
Figure 6B:
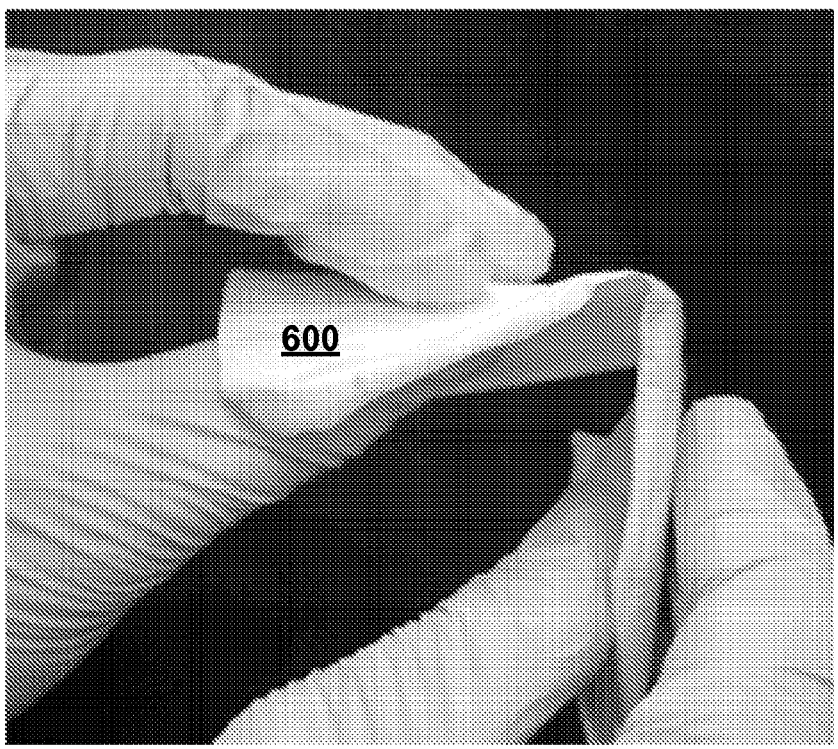
FIG. 6B shows the free-standing polymer/sol-gel nanowires.

Nanowires obtained from electrospinning may form nonwoven films at the collector during the electrospinning process, which combines several steps and facilitates scale-up. As shown in FIGS. 6A and 6B, the as-spun fiber mat can be peeled off the collector 602 as a free-standing film and placed in a crucible for calcination to crystallize the sol-gel and remove the organics. Calcination temperatures and times vary depending on the composition of the solid electrolyte. Typical calcination conditions for electrospun LLTO nanowires are heating at temperatures between 800 to 1300° C. for 3 to 24 h, and 700 to 900° C. for 2.5 to 12 h for electrospun LLZO nanowires. The ramp rate can also be adjusted to achieve different morphologies. The calcined nanofibers are polycrystalline, and the size of grains orcrystallites is usually in the range of several tens of nanometers. It is generally understood that the size distribution of the crystallites is more uniform than that from conventional sol-gel methods. Small grains can increase the sinterability of ceramic powders, which in turn yields asintered body having high density, compactness, or both. As such, the quality of the grain boundaries is high, yielding improved grain boundary conductivity, and hence improved overall conductivity.

The structure and morphology of an individual nanofiber can be manipulated to have different features. The most common ones are core-shell structure and porous structure. To produce core-shell structure, the co-axial spinning technique is usually used. Porous structures mainly rely on two mechanisms—selective removal and phase separation. The first one is essentially the same as making hollow fibers, in which small particles are imbedded into the fibers, and can be removed afterwards. The latter mechanism is usually realized through rapid solvent evaporation, or reaction within the fibers. All these features aim at increasing the surface area of the fibers, which is desirable in a number of applications. Recently, hierarchical structures grown on the nanofibers have emerged in the art, revealing more possibilities of further fine-tuning.

The fibers can also be patterned upon collection by using various specially designed collectors. For example, a rotating wheel or drum can align the fibers along the direction of rotation. Two electrodes with a gap in between can force the fibers to bend perpendicular to the gap, resulting in a uniaxial array. By utilizing several such electrode pairs and alternating the sequence of voltage application, stacked layers of aligned fibers can be formed, with each layer having a different orientation.

Figure 7:
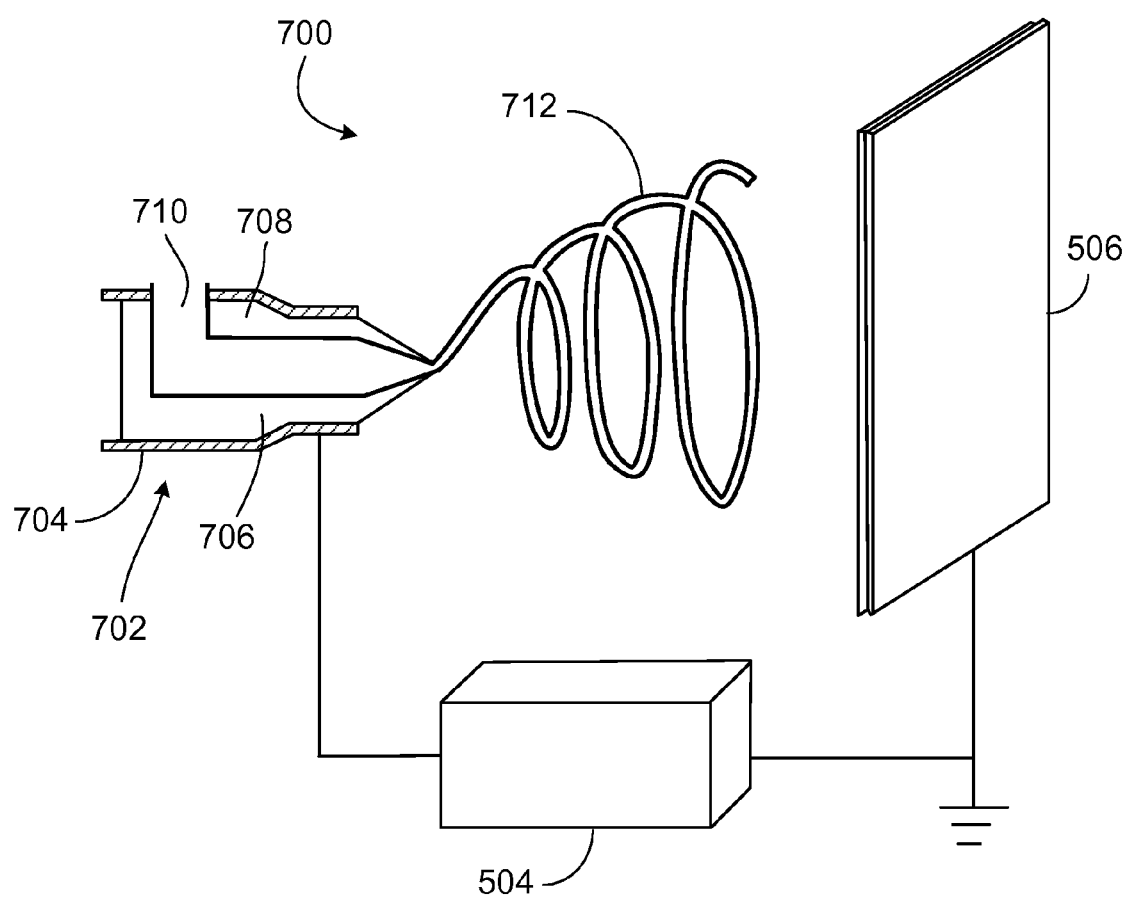
FIG. 7 depicts an electrospinning setup for synthesis of core-shell nanowires.

To make core-shell structures, shells can be deposited onto the nanowires using a variety of different methods, such as sol-gel deposition, chemical vapor deposition, atomic layer deposition, pulsed laser deposition, electrodeposition, sputtering, and thermal or electron beam evaporation. Co-axial electrospinning, which has been previously demonstrated using either a two-stage or co-annular nozzle, can also be used to form core-shell structures from two separate sol-gel precursor solutions. FIG. 7 depicts formation of core-shell structures via co-axial electrospinning apparatus 700, in which two precursors are spun through a co-axial spinneret 702. In some cases, co-axial spinneret 702 includes outer needle 704 and inner needle 706. Outer shell solution 708 is provided through outer needle 704, and inner core solution 710 is provided through inner needle 706 to yield co-axial jet 712. The two precursors should not be miscible in order to obtain two distinct phases. Hollow fibers are thus made possible by simply removing the core material. The core-shell structures can also be obtained by infiltrating shell precursors into the porous nanowire mats obtained from regular electrospinning Example shell materials for studying space charge effects include polymers such as polyethylene oxide and non-conductors like $Al_2O_3$ and $SiO_2$. The polymer/nanowire composites may display interesting mechanical properties (such as enhanced flexibility) but may have decreased thermal stability compared to all-inorganic composites.

Other configurations utilizing a nanowire coated with another material are also possible. For example, nanowire cores can be coated with multiple shells to make core-shell-shell materials. There can also be multi-core fibers where multiple nanowires are bundled together and coated with a single shell layer. There are also other methods to synthesize nanowires, such as near-field electrospinning, template-guided growth, and shear force spinning, which are known to those familiar with the art.

Properties of nonwoven nanowire films, such as strength, flexibility, and ionic conductivity, may be enhanced with organic or inorganic additives (e.g., binders or fillers) to reduce porosity and cover weak contact points. The binders or fillers may be added during formation of the nonwoven nanowire films or applied in one of various forms (e.g., as a sol-gel) to the film after it has been formed. Such additives are preferably selected such that ionic transport of lithium ions is not negatively impacted. In some cases, an additive is lithium-ion conducting (e.g., a lithium-ion conducting polymer such as polyethylene oxide, PEO). By using nanowires, the film composite will have smaller volumes of PEO-only regions (which can lower conductivity and mechanical properties) and be better dispersed. In some cases, the amount of additive is about 5 wt % or less. In certain cases, heat treatment of a nonwoven nanowire film may be used to improve the strength of the film through pore size reduction and densification.

An additive may also include a surface coating selected to improve one or more properties of a nonwoven nanowire film, such as chemical or thermal stability (e.g., stability of $LiNbO_3$ and crystalline LLTO against reduction by lithium metal), without increasing the overall resistance of the electrolyte. The coating may include another lithium-ion conductor, such as amorphous LLTO or crystalline LLZO.

Nonwoven nanowire films described herein can be fabricated in the form of a sheet. The sheet of solid electrolyte can be combined with sheets of anode material (e.g., graphite, silicon, $Li_4Ti_5O_{12}$, Li metal and the like) and cathode material (e.g., $LiCoO_2$, $LiMn_2O_4$, $LiFePO_4$, and the like) generally known in the art by methods such as hot pressing, screen printing, or laminate body preparation to yield an all-solid-state lithium-ion battery. Adequate contact between the electrodes and solid electrolyte are a factor in optimal performance of an all-solid-state battery since charge transfer occurs at the solid-solid interface, and voids or impurities can result in a large interfacial resistance. Nanowire electrolytes can be advantageous in that the nanowires are synthesized prior to integration with the cathode and can be adjusted to a favorable crystallinity prior to assembly with the electrodes. Annealing may promote good contact with the electrode materials, and can be done at a lower temperatures than that needed to crystallize a sol-gel.

All-solid-state lithium-ion batteries can be fabricated by various methods, such as direct screen printing, lamination, and the like. In some implementations, an all-solid-state lithium-ion battery includes a "buffer" layer at the interface between the solid electrolyte and cathode to improve charge transfer and lower interfacial resistance. Suitable buffer layers include, for example, $Li_3BO_3$, $Li_2O$—$ZrO_2$, $LiNbO_3$, and amorphous LLTO. Other suitable buffer layers may include composites containing ceramic lithium-ion conductors and polymeric lithium-ion conductors, in which the polymer (e.g., PEO, which is stable in contact with lithium metal) may help impart more flexibility to the nanowire films, reduce void spaces, and mitigate interface and chemical stability problems with the electrodes. The small diameters of nanowires in the nanowire film enhance the contact area between the solid electrolyte and electrode materials, and also allow for dense networks to be formed with smaller void spaces, resulting in less buffer material required. The nanowires will fill the void spaces left between adjacent micron-sized particles in the anode or cathode. The flexibility of the nanowire films may also help to mitigate volume changes in the anode, thereby reducing disruption of the electrolyte-anode interface.

EXAMPLES

Example 1

Figure 8A:
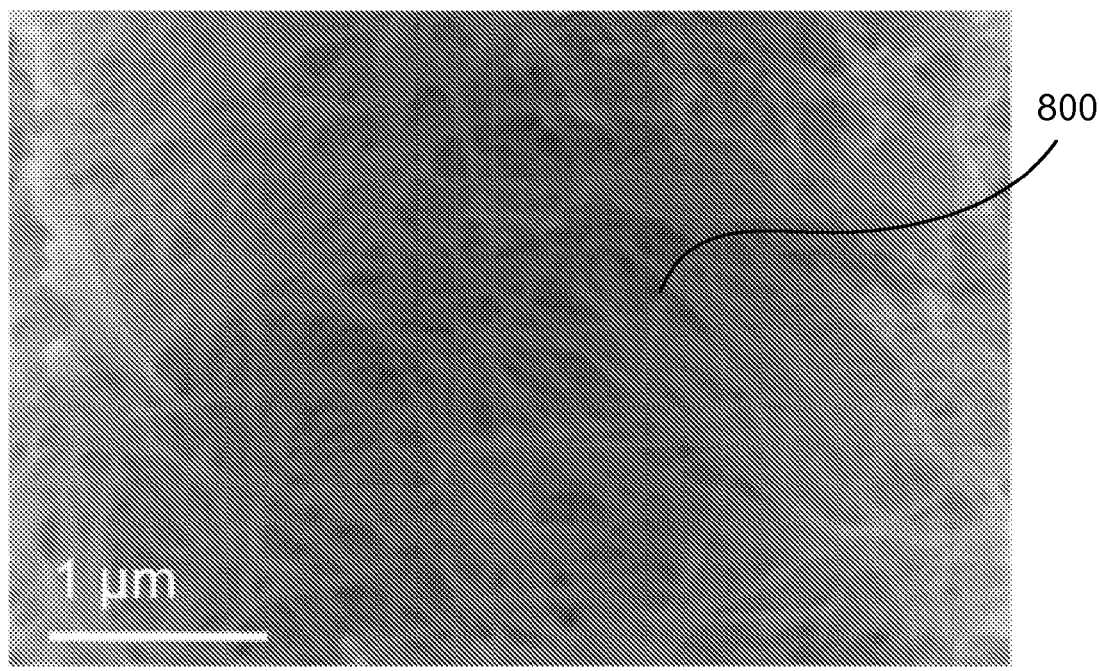
FIG. 8A shows a scanning electron microscope (SEM) image of amorphous $LiNbO_3$ nanowires.
Figure 8B:
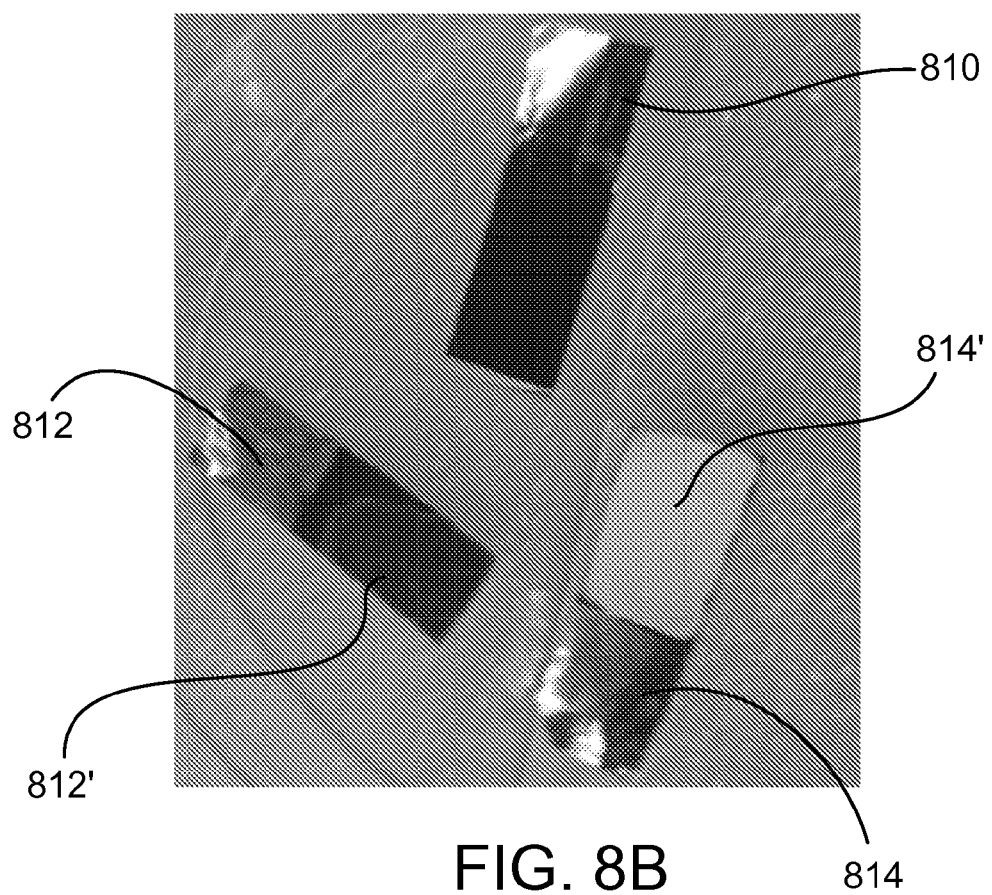
FIG. 8B shows a photograph of $LiFePO_4$ cathodes coated with $LiNbO_3$ nanowire films.
Figure 8C:
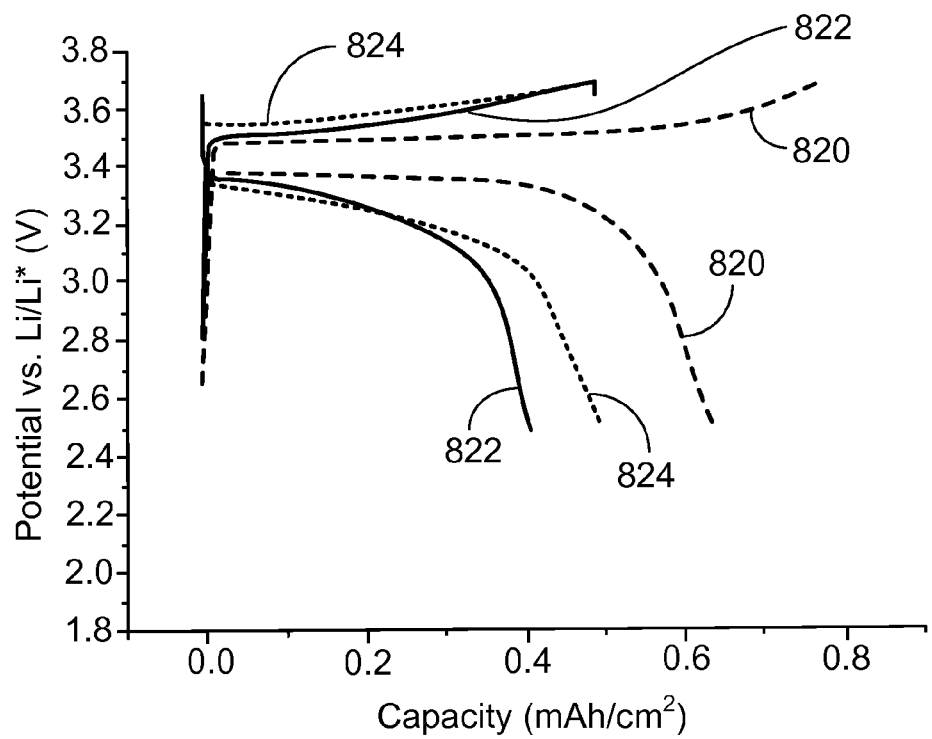
FIG. 8C shows voltage profile of the first charge and discharge for half cells prepared as described in Example 1.
Figure 8D:
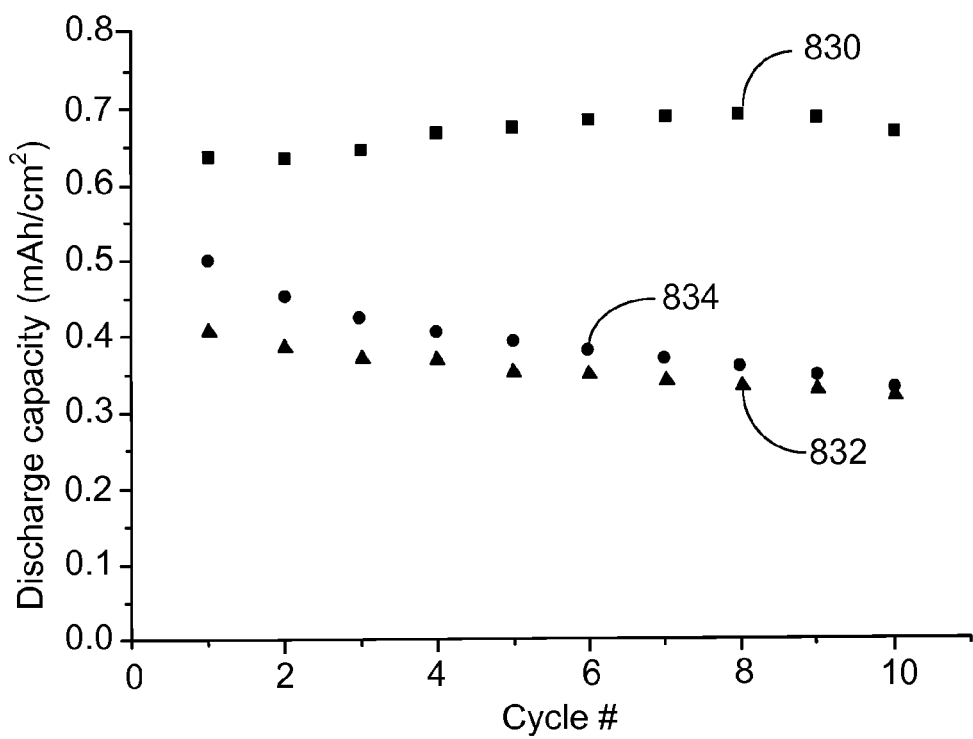
FIG. 8D shows the capacity for 10 cycles for half cells prepared as described in Example 1.

Amorphous $LiNbO_3$ nanowires were prepared by decomposition of a niobium-containing complex in the presence of a structure-directing solvent using procedures generally known in the art. FIG. 8A shows a SEM image of amorphous $LiNbO_3$ nanowires 800. The nanowires were drop cast at different concentrations to make thin and thicker $LiNbO_3$ films on commercial $LiFePO_4$ cathodes (from MTI Corp.). FIG. 8B shows a photograph of the $LiFePO_4$ cathodes 810, 812, and 814. $LiFePO_4$ cathode 810 is uncoated. Cathodes 812 and 814 were coated with films of $LiNbO_3$ nanowires by dropcasting. $LiFePO_4$ cathode 812 is coated with a thin film of $LiNbO_3$ nanowires 812', and $LiFePO_4$ cathode 814 is coated with a thick film of LiNbO$_3$ nanowires 814'. Half cells were made using LiNbO$_3$/LiFePO$_4$ electrodes with the conventional separator and liquid electrolyte to evaluate the effect of the solid electrolyte film on the cathode. Plots 822 and 824 in FIG. 8C show the voltage profile of the first charge and discharge for the cathodes 812 and 814, respectively, and plot 820 shows the voltage profile of the first charge and discharge for cathode 810. Plots 832 and 834 in FIG. 8D show the capacity for 10 cycles for the cathodes 812 and 814, respectively, compared to that for cathode 810. Although the capacities are lower for the cathodes 812 and 814, the interface and integration methods were not optimized (e.g., no pressure was applied after coating). It is unlikely that the thicker film of cathode 814 could have allowed substantial liquid electrolyte penetration to the LiFePO$_4$.

Example 2

Figure 9A:
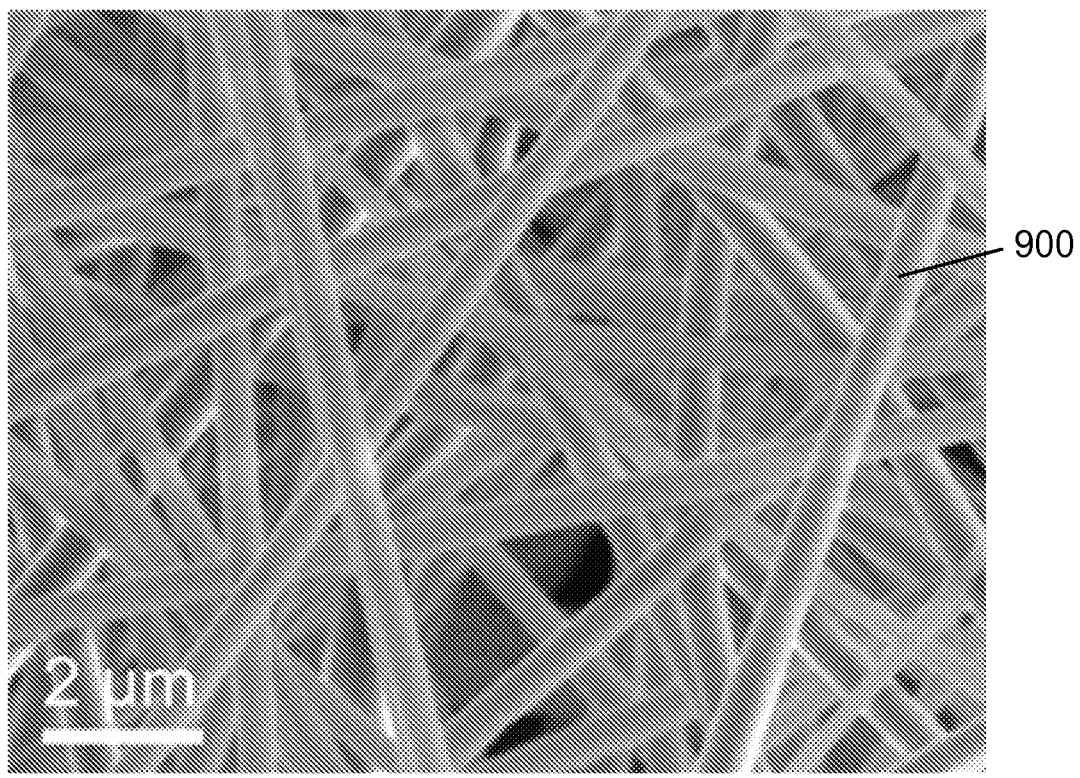
FIG. 9A shows an SEM image of as-spun lithium lanthanum titanate (LLTO) nanowires.
Figure 9B:
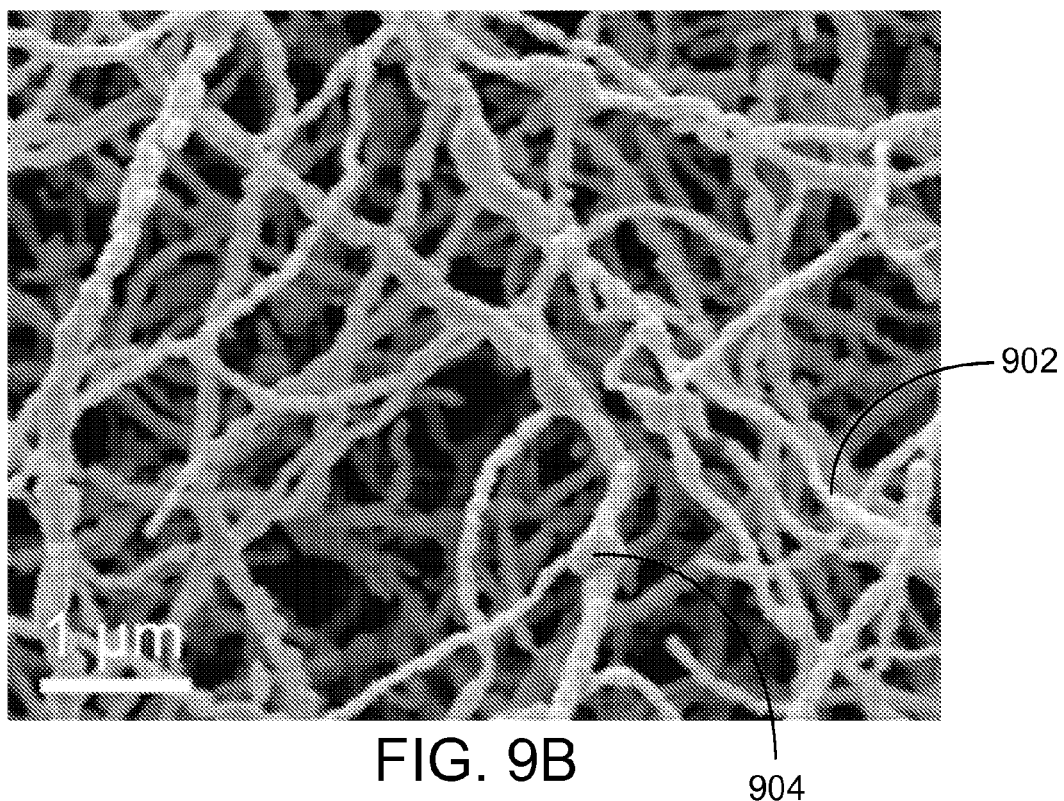
FIG. 9B shows an SEM image of calcined LLTO nanowires.
Figure 9C:
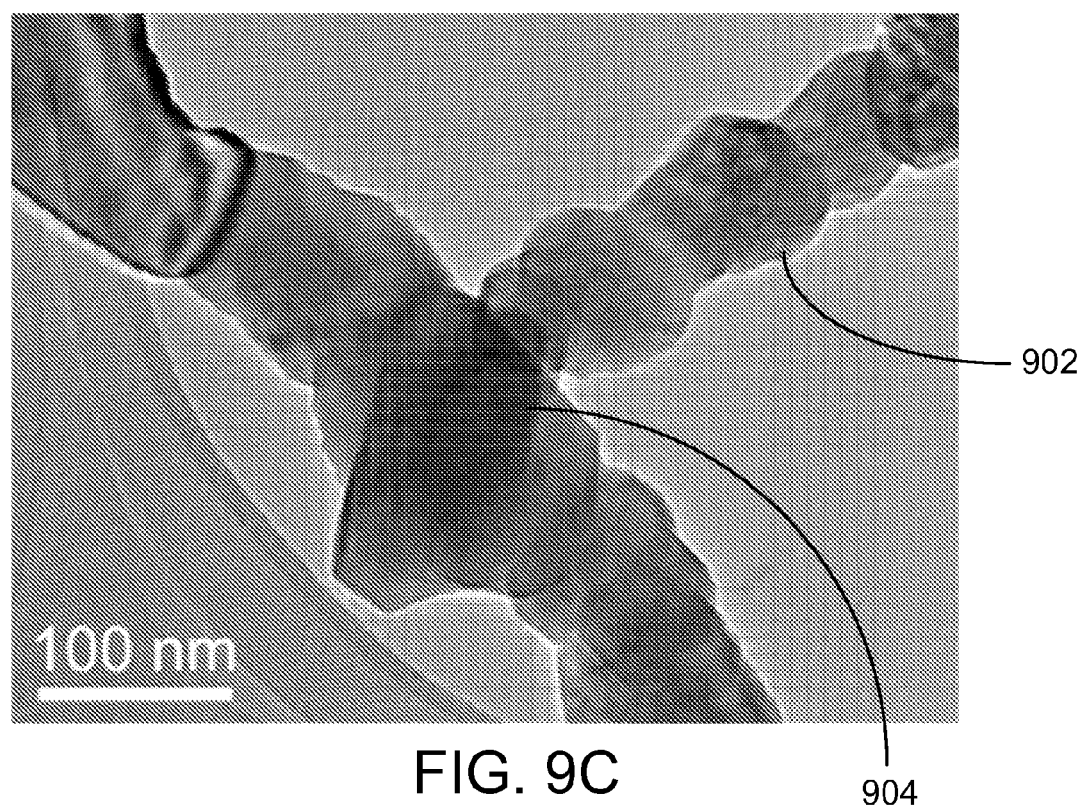
FIG. 9C shows a TEM image of calcined LLTO nanowires, depicting that the calcined nanowires are composed of small individual grains/crystallites.
Figure 9E:
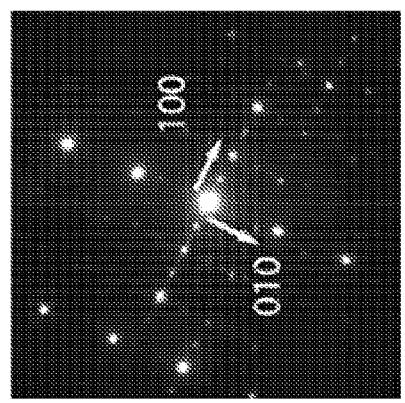
FIG. 9E shows the electron diffraction pattern of a grain shown in FIG. 9D.
Figure 9F:
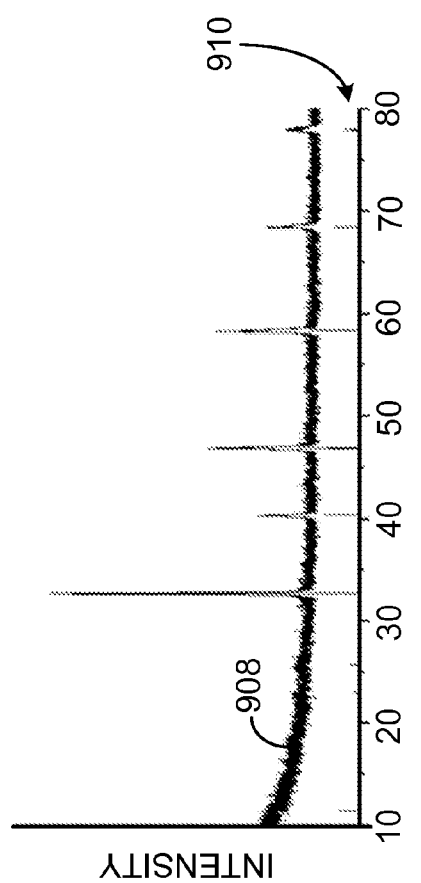
FIG. 9F shows an XRD pattern of calcined LLTO nanowires, with the reference pattern being $Li_{0.378}La_{0.622}TiO_3$.
Figure 9D:
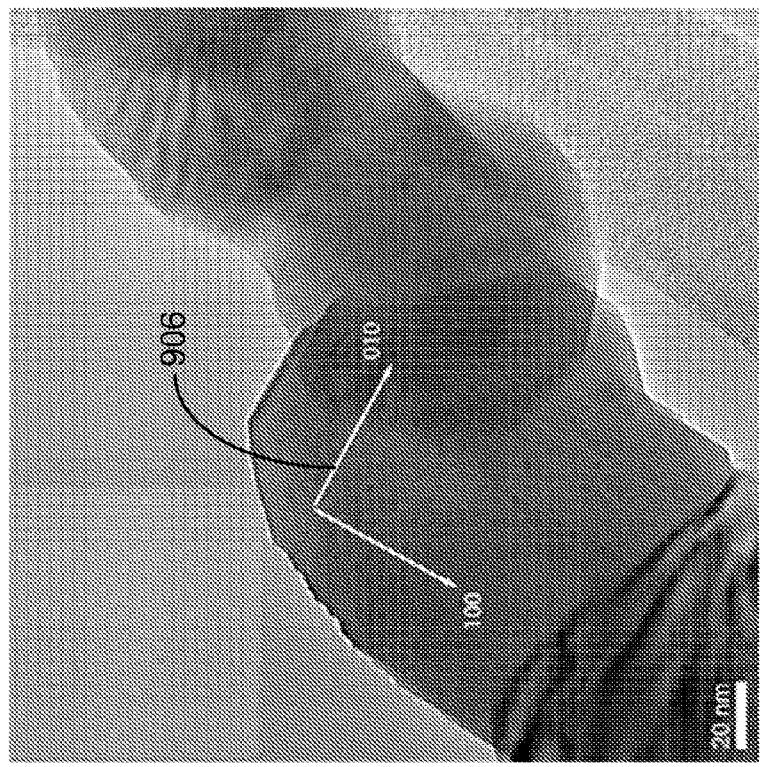
FIG. 9D shows a high resolution TEM image with lattice fringes visible and grain orientation labelled.
Figure 10A:
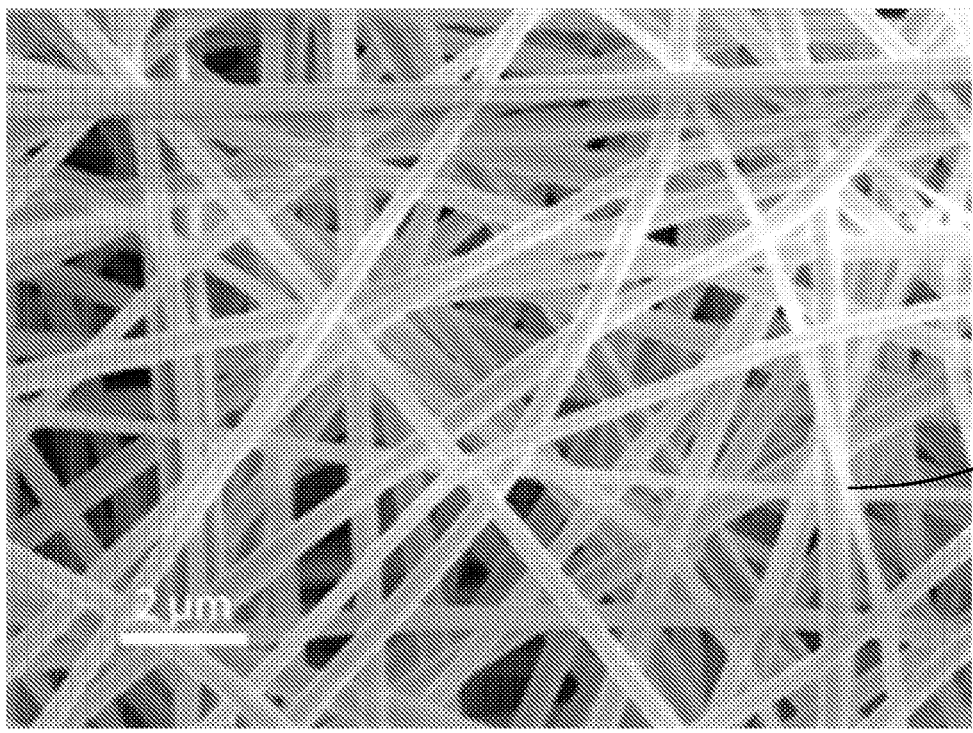
FIG. 10A shows an SEM image of as-spun LLZO nanowires.
Figure 10B:
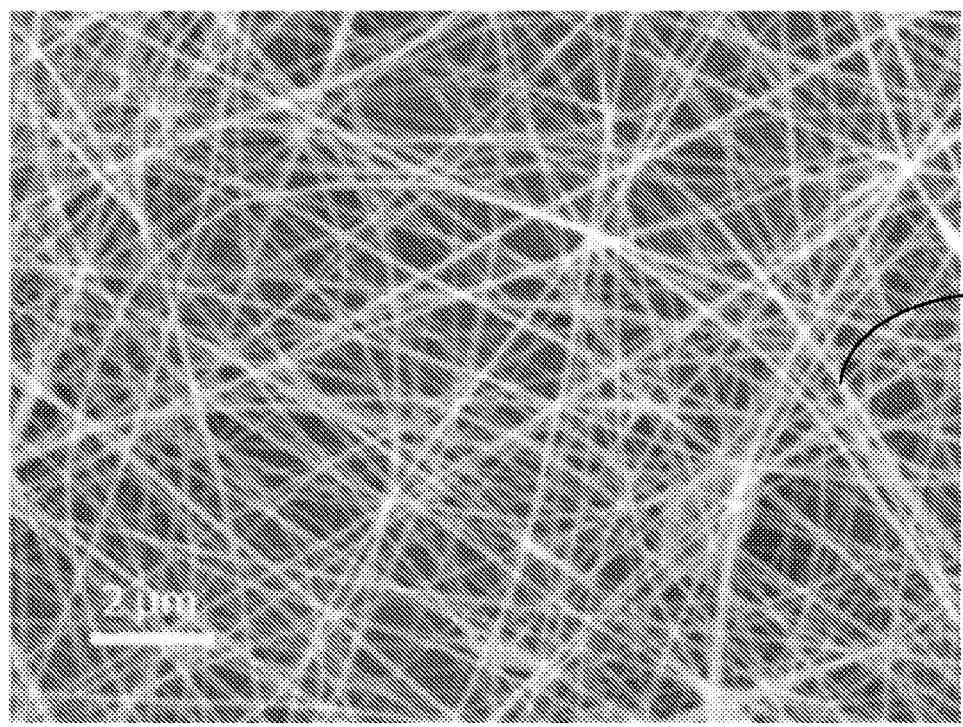
FIG. 10B shows the effect of decreasing the feed rate during electrospinning, resulting in reduced nanowire diameter.

LLTO nanowires were prepared using electrospinning. The precursor was made of a mixture of LLTO sol (lithium acetate, lanthanum acetate, titanium isopropoxide, isopropanol, acetic acid and water) and 10 wt % PVP in acetic acid, with a 1:1 volume ratio. The voltage was 7 kV, the distance was kept at 10 cm and the feed rate was 0.3 mL/h FIG. 9A shows an SEM image of as-spun nanowires 900, and FIG. 9B shows as-spun nanowires 900 after calcination to yield linked crystallites 902. The ramp time was set to 5 h, and the sample was heated at 1000° C. for 3 h. It can be seen that linked crystallites 902 include individual crystallites that are connected at junctions 904. FIG. 9C is a transmission electron microscopy (TEM) image showing the linked crystallites 902. FIG. 9D is a higher magnification TEM image showing the lattice fringes of individual grains, with the orientation of center grain 906 labelled. FIG. 9E shows the electron diffraction pattern of grain 906, which also shows the orientation of that grain. FIG. 9F shows the X-ray diffraction (XRD) pattern 908 of calcined LLTO fibers, which matches to the reference pattern 910 for Li$_{0.378}$La$_{0.622}$TiO$_3$. It should be noted that, the synthesis of bulk LLTO typically requires high temperature (>1100° C.) and long heating time (>12 h). However, for the electrospun fibers described herein, 3 h at 1000° C. is enough to produce comparable material. FIGS. 10A and 10B show SEM images of as-spun LLZO nanowires 1000 and 1002, respectively, formed with different feed rates than the nanowires of FIG. 9A. The precursor was prepared according to the procedures described in this example. With other parameters kept the same, nanowires 1000 of FIG. 10A were formed with a feed rate of 0.3 mL/h, while nanowires 1002 of FIG. 10B were formed with a feed rate of 0.1 mL/h.

Example 3

Figure 11A:
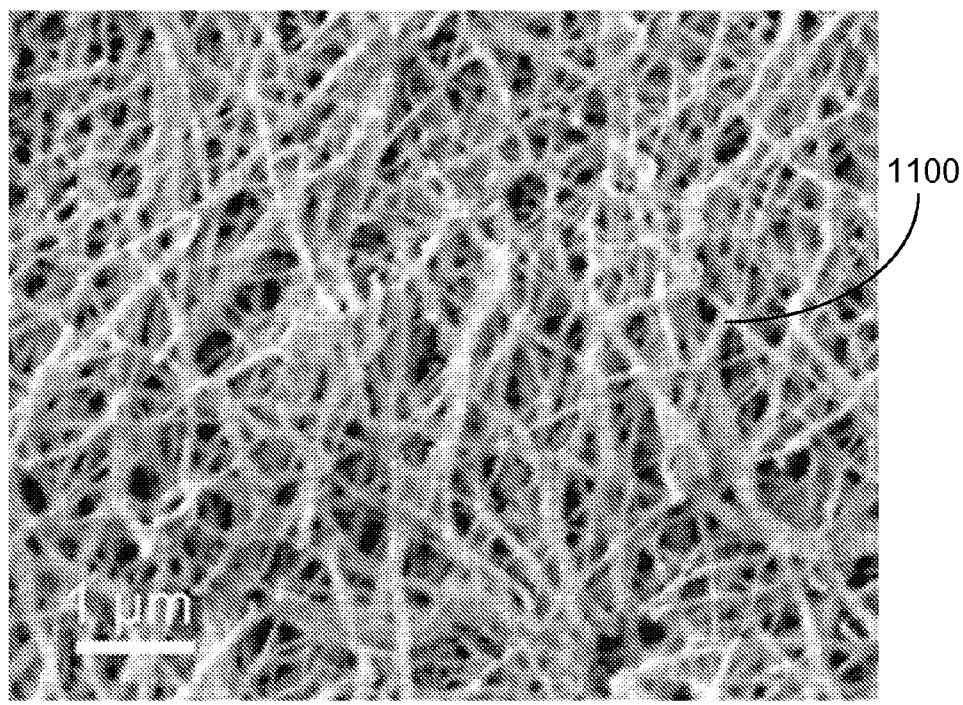
FIG. 11A shows an SEM image of calcined LLZO nanowires.
Figure 11B:
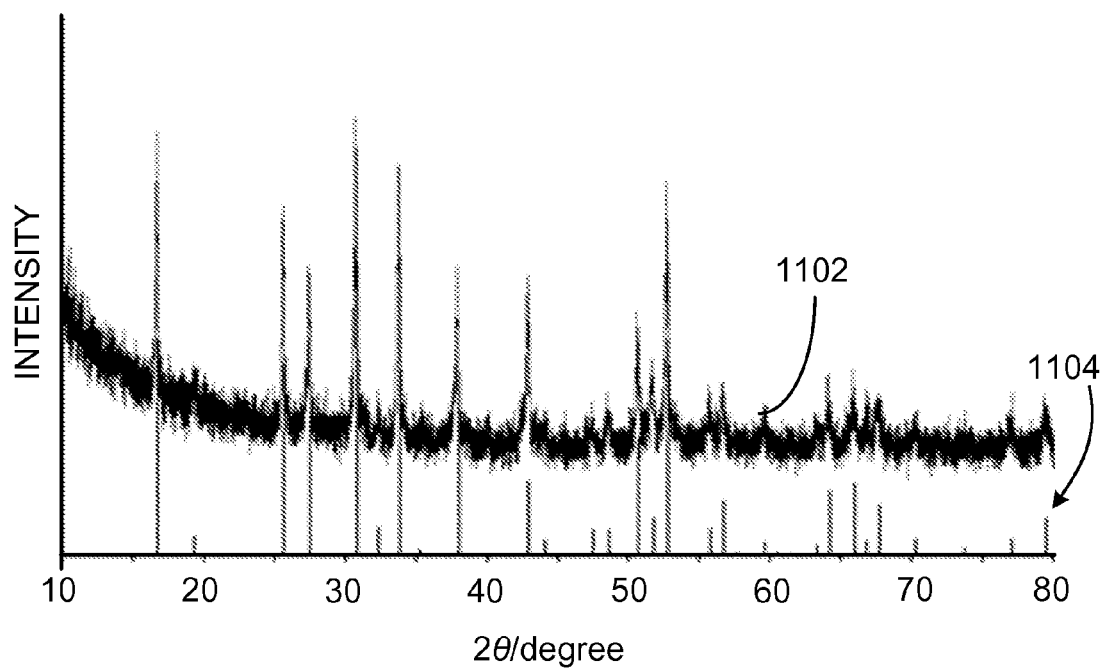
FIG. 11B shows an XRD pattern of calcined LLZO nanowires.

LLZO nanowires were prepared using electrospinning. FIG. 11A is an SEM image of calcined LLZO fibers 1102. The precursor of this example was made by adding 0.2 g PVP into 0.4 mL of LLZO sol. The reagents for LLZO sol were lithium acetate, lanthanum acetate, zirconium propoxide, acetic acid and water. The voltage was set at 11 kV, the distance was 10 cm and the feed rate was 0.2 mL/h. The ramp time was 1 h, and the sample was heated at 700° C. for 2.5 h. FIG. 11B shows the XRD pattern 1102 of calcined LLZO fibers 1100, with a structure that matches the reference pattern 1104 for cubic phase LLZO. FIG. 11C compares the XRD patterns of bulk LLZO 1106 (tetragonal phase) and electrospun LLZO 1108 (cubic phase). The bulk material was synthesized according to a common sol-gel method known in the art, and the calcination was done at 700° C. for 5 h. The electrospun fibers used the same sol in the precursor and were calcined under identical conditions. After calcination, the bulk material was in tetragonal phase, while the nanowire sample crystallized in the cubic phase. It should be noted that tetragonal LLZO has a Li$^+$ ion conductivity of about $10^{-6}$ to $10^{-7}$ S/cm, whereas metastable cubic LLZO has an ionic conductivity of about $10^{-4}$ S/cm. Therefore, the nanowire LLZO can adopt the high conductivity phase at calcination conditions where bulk LLZO remains tetragonal. This is likely due to a surface energy stabilization effect that makes the cubic phase more stable in the LLZO nanowires without requiring extrinsic dopants. This stabilization may be size dependent, with a critical grain size, beyond which the crystal structure will turn from cubic to tetragonal.

Figure 11D:
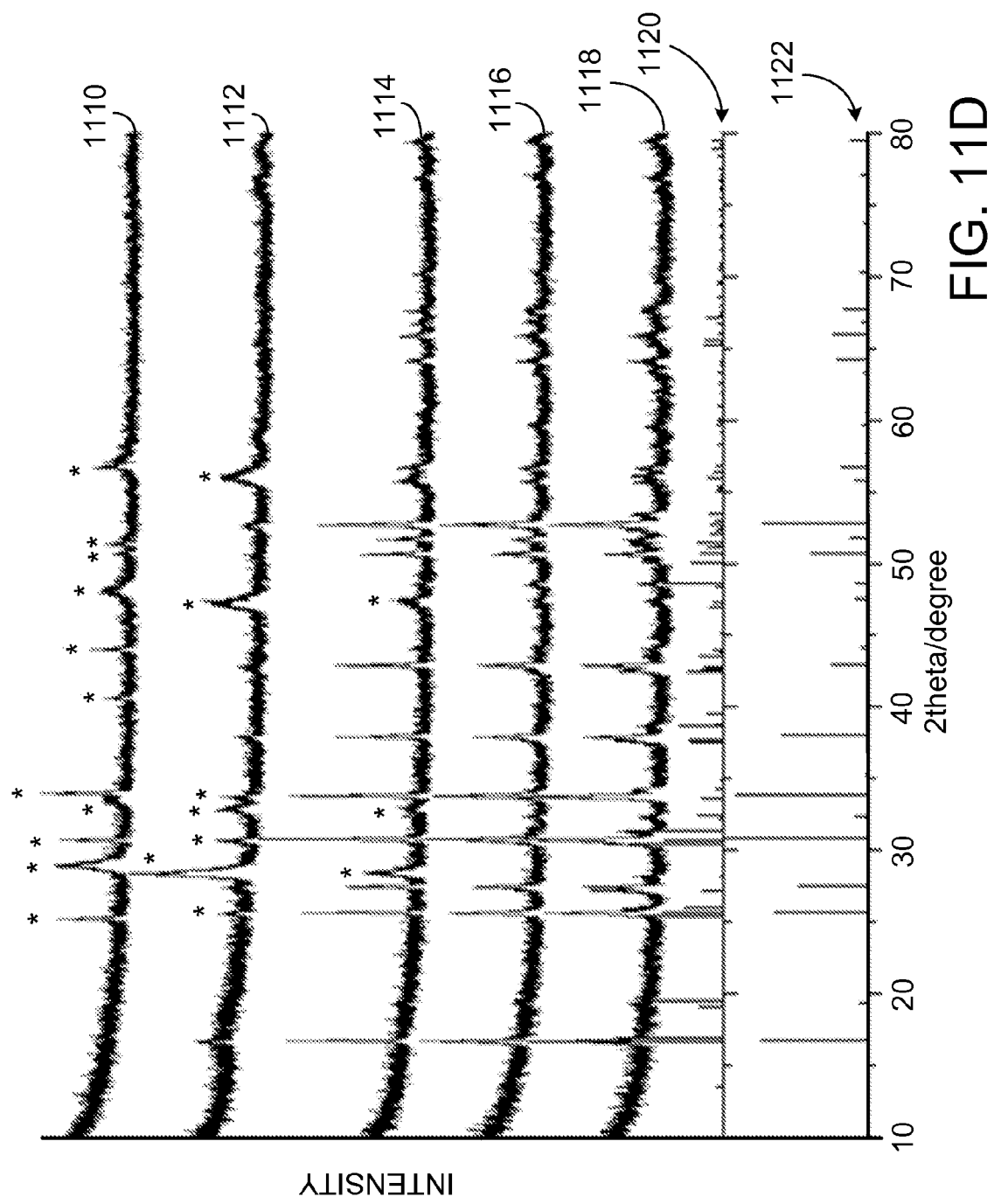
FIG. 11D shows XRD patterns of calcined LLZO nanowires with different calcination times.
Figure 11E:
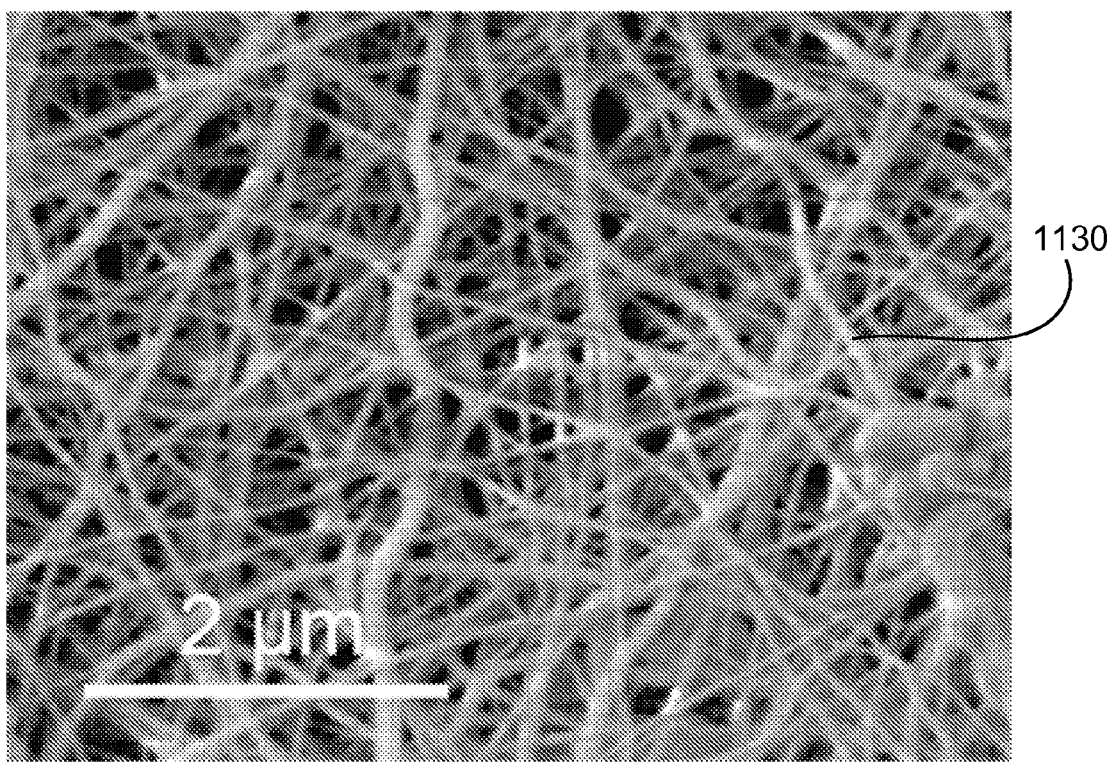
FIG. 11E shows an SEM image of LLZO nanowires calcined for 1.5 h.
Figure 11F:
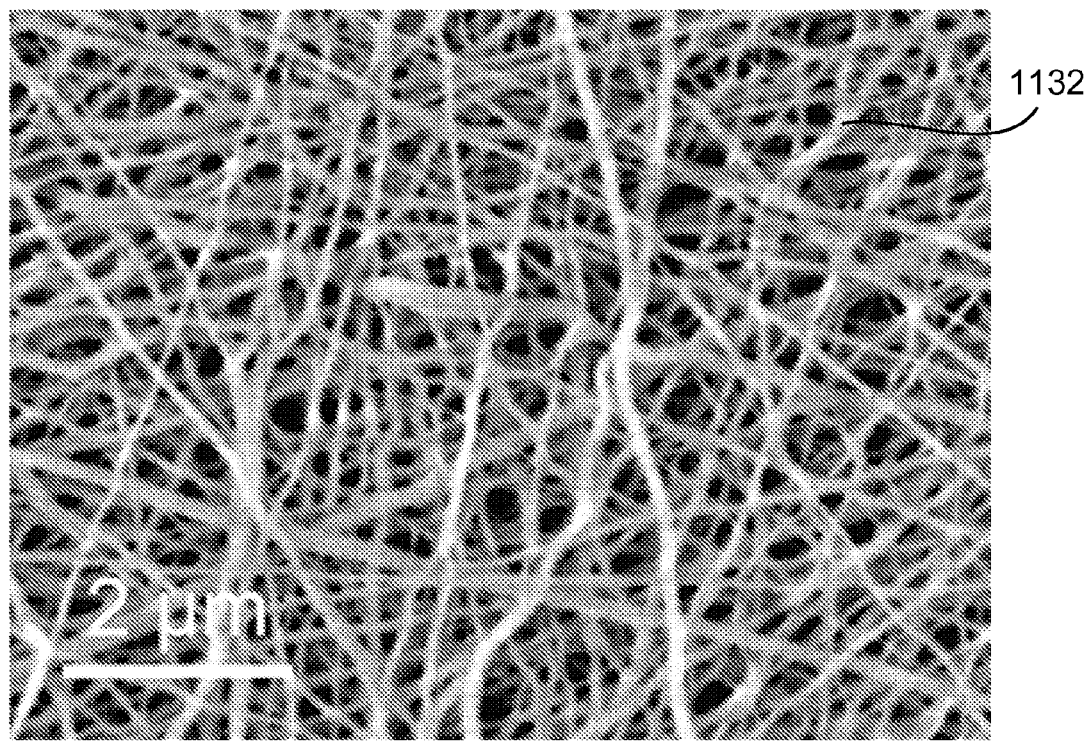
FIG. 11F shows an SEM image of LLZO nanowires calcined for 2 h.
Figure 11G:
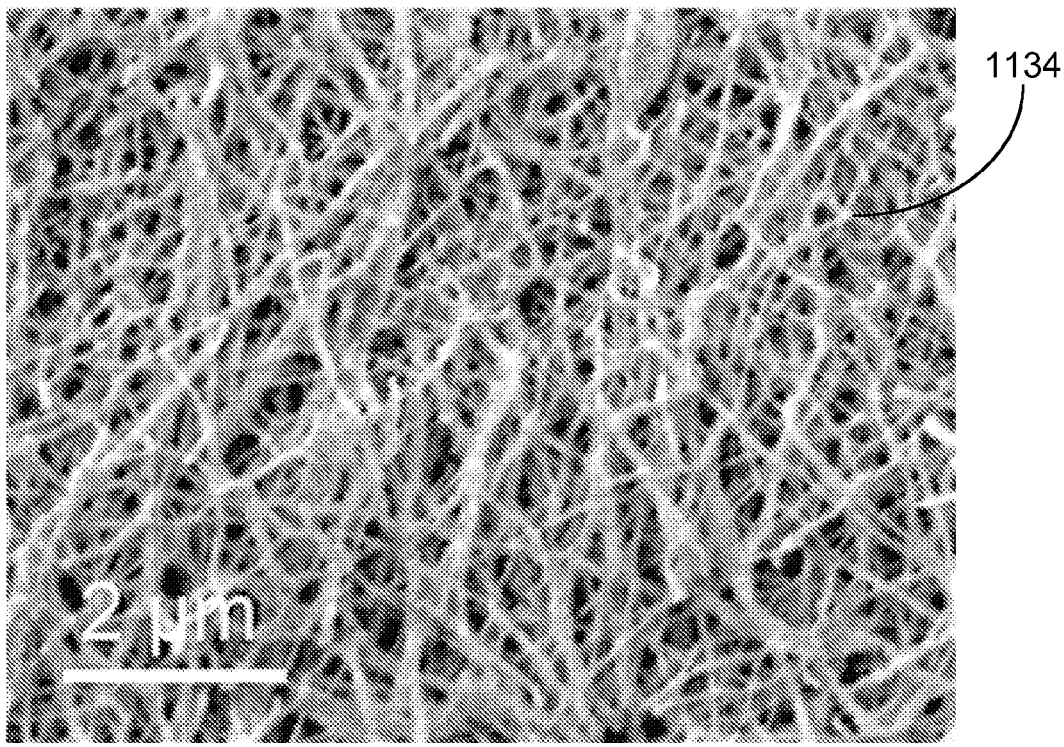
FIG. 11G shows an SEM image of LLZO nanowires calcined for 2.5 h.
Figure 11H:
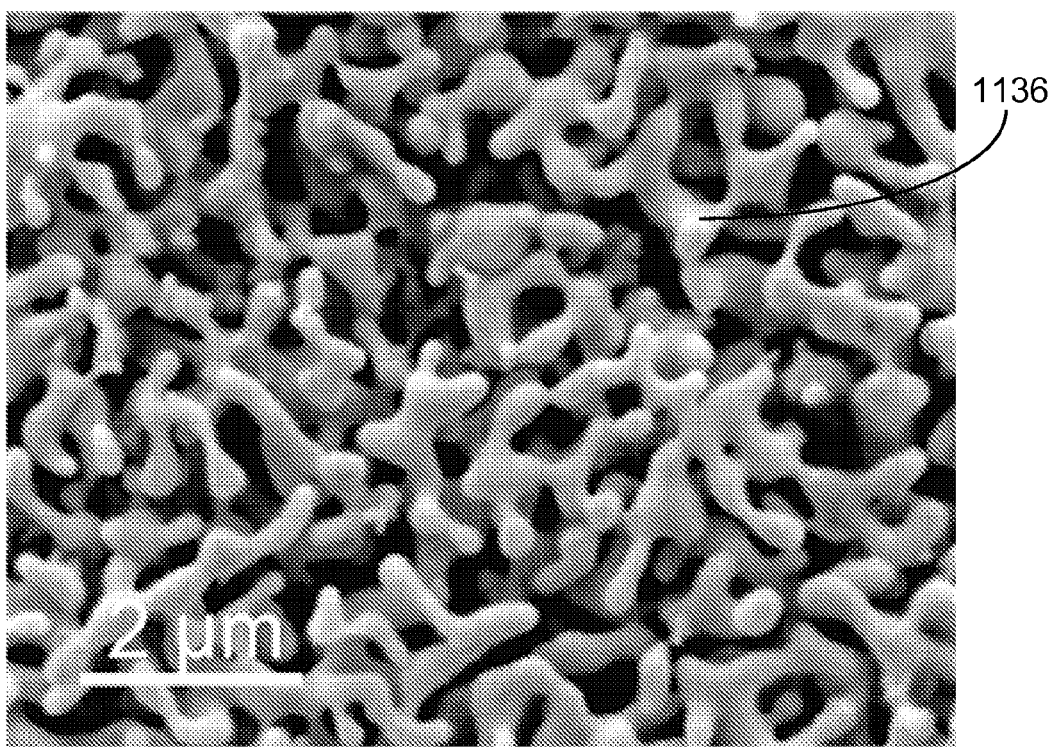
FIG. 11H shows an SEM image of LLZO nanowires calcined for 3 h.
Figure 11I:
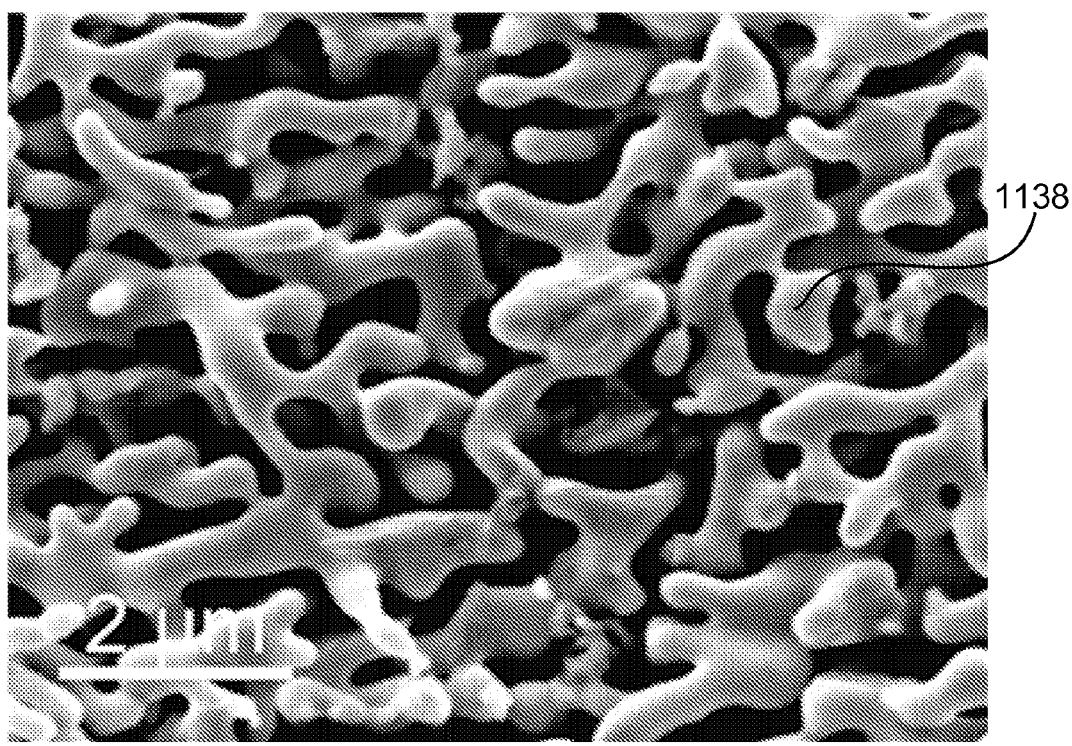
FIG. 11I shows an SEM image of LLZO nanowires calcined for 5 h.
Figure 11J:
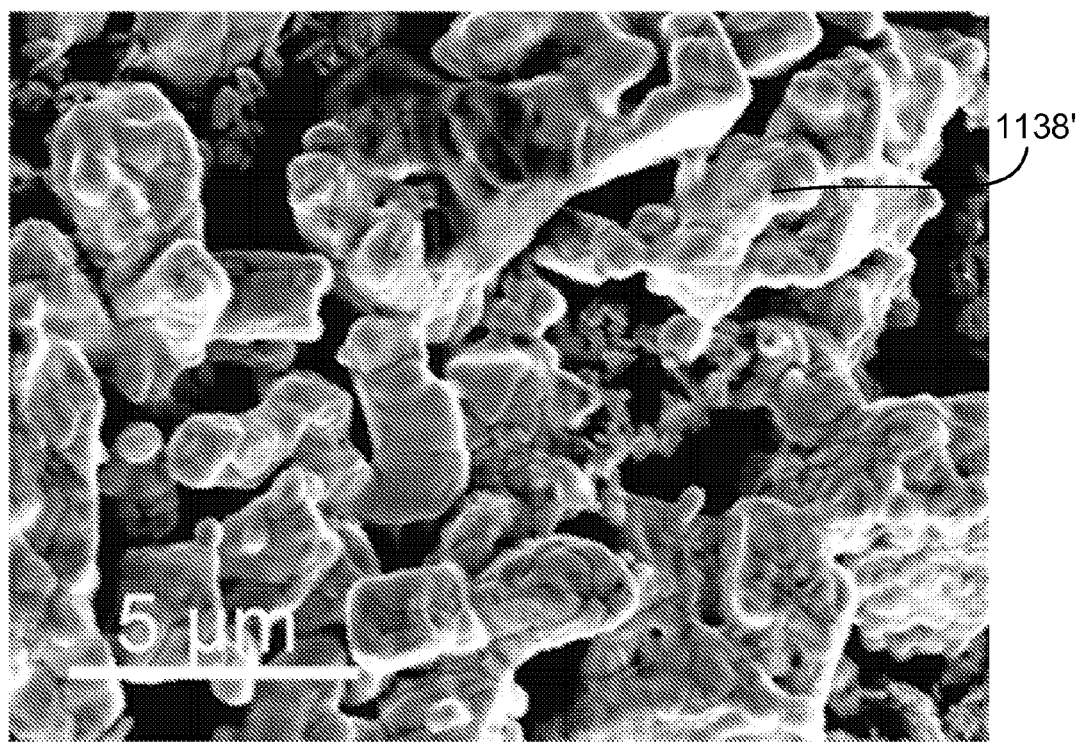
FIG. 11J shows another SEM image of LLZO nanowires calcined for 5 h.
Figure 11K:
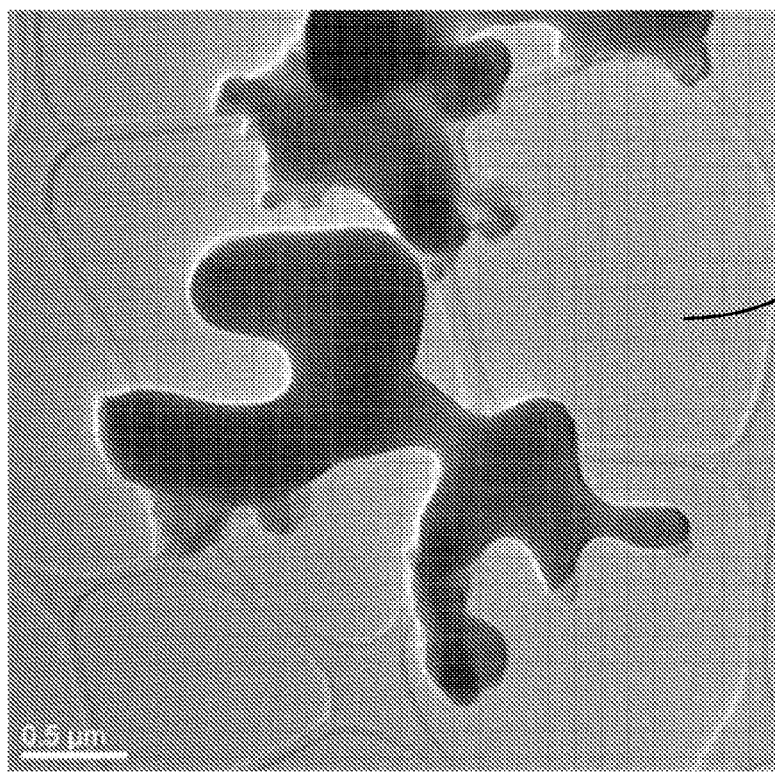
FIG. 11K shows a TEM image of LLZO nanowires calcined for 3 h.

Electrospun LLZO fibers were calcined under the same temperature (700° C.) but for different time periods. The XRD results are shown in FIG. 11D, with plots 1110, 1112, 1114, 1116, and 1118 corresponding to calcination times of 1.5 h, 2 h, 2.5 h, 3 h, and 5 h, respectively ("*" indicating lithium-deficient phases), and plots 1120 and 1124 showing reference patterns for tetragonal LLZO and cubic LLZO, respectively. With 1.5 h of calcination (plot 1110), only lithium deficient phases (e.g. La$_2$Zr$_2$O$_7$ and compounds with lithium content less than the stoichiometric number) were formed, and there was no LLZO present. After 2 h (plot 1112), an appreciable amount of LLZO started forming. At 2.5 h (plot 1114), cubic phase LLZO became the major product and the lithium deficient phase was reduced significantly. After 3 h (plot 1116), the product was phase pure cubic phase LLZO. When heated for 5 h (plot 1118), some peaks split into "doublets", indicating the emergence of tetragonal phase LLZO. This is likely due to the coarsening of grains, which is evident from the corresponding SEM images in FIG. 11E-J. FIG. 11E and FIG. 11F show nanowires 1130 and 1132 heated for 1.5 h and 2 h, respectively. The fibers more or less maintained the as-spun morphology. FIG. 11G shows nanowires 1134 heated for 2.5 h. In FIG. 11G, a significant amount of LLZO formed per XRD result, but it is difficult to tell from the SEM image. FIG. 11H shows nanowires 1136 heated for 3 h. Coarsening of the fibers can be seen in FIG. 11H. FIG. 11I and FIG. 11J show nanowires 1138 and 1138' from different regions of the sample heated for 5 h. Some of the fibers already coalesced and grew into large pieces, while some remained similar as those in FIG. 11H. The large particles are likely tetragonal phase and the small ones are likely cubic. This mixed structure is manifested as the "splitting of peaks" seen in plot 1118 of FIG. 11D, which indicates the coexistence of both phases. FIG. 11K is a TEM image of the LLZO nanowires calcined for 3 h sample at 700° C. to yield nanowires 1140.

It should be noted that, in the current art, the synthesis of bulk LLZO, a temperature greater than 750° C. and heating time longer than 4 h is usually needed. Additionally, it is a common practice in the art that a small amount of dopant material is added during synthesis in order to obtain the high conductivity cubic phase. By synthesizing LLZO with nanowire morphology as described herein, the reaction temperature and time are significantly reduced, and the product is formed in the cubic phase without any doping.

Example 3

Figure 12A:
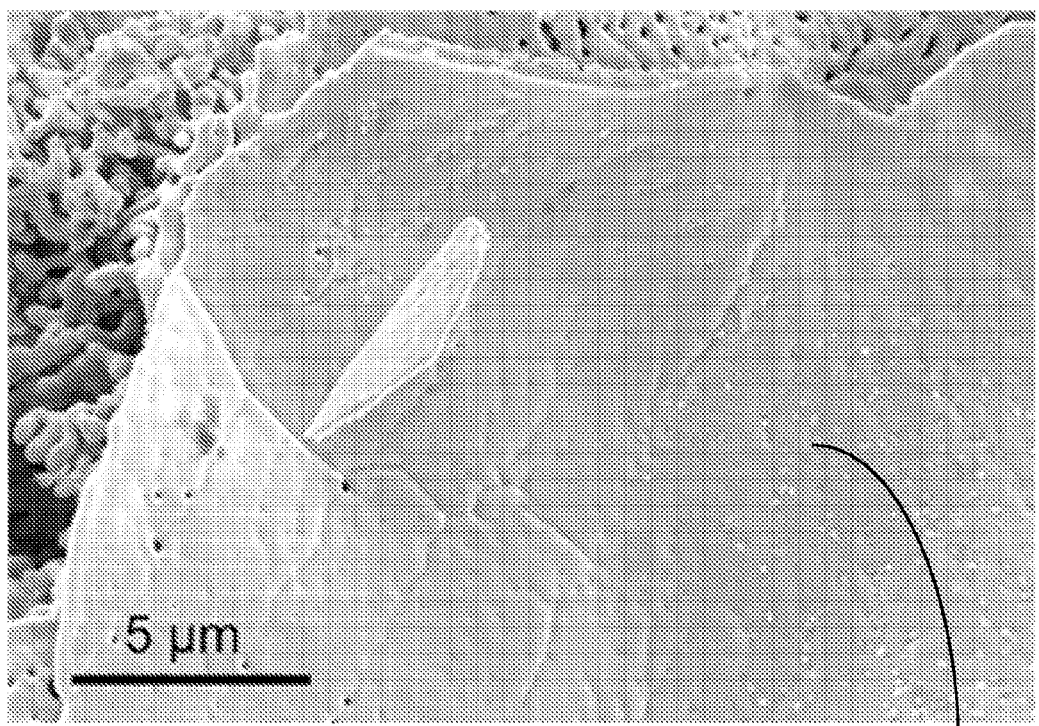
FIG. 12A shows an SEM image of calcined LLZO nanowires with sheet-like morphology.
Figure 12B:
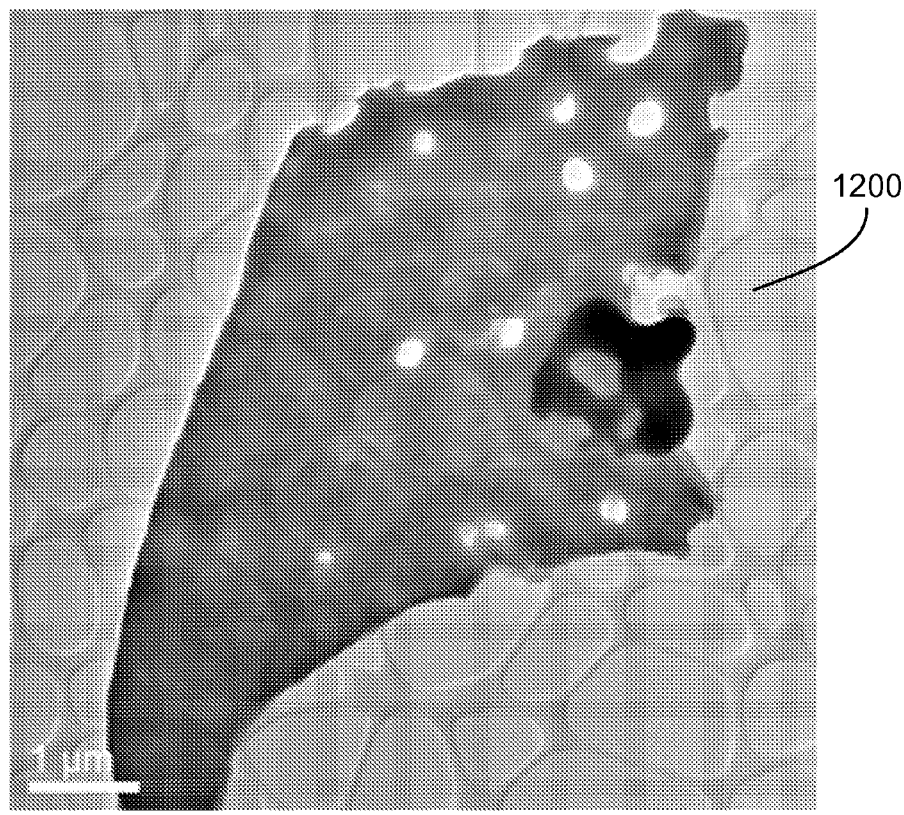
FIG. 12B shows a TEM image of calcined LLZO nanowires with sheet-like morphology.
Figure 12C:
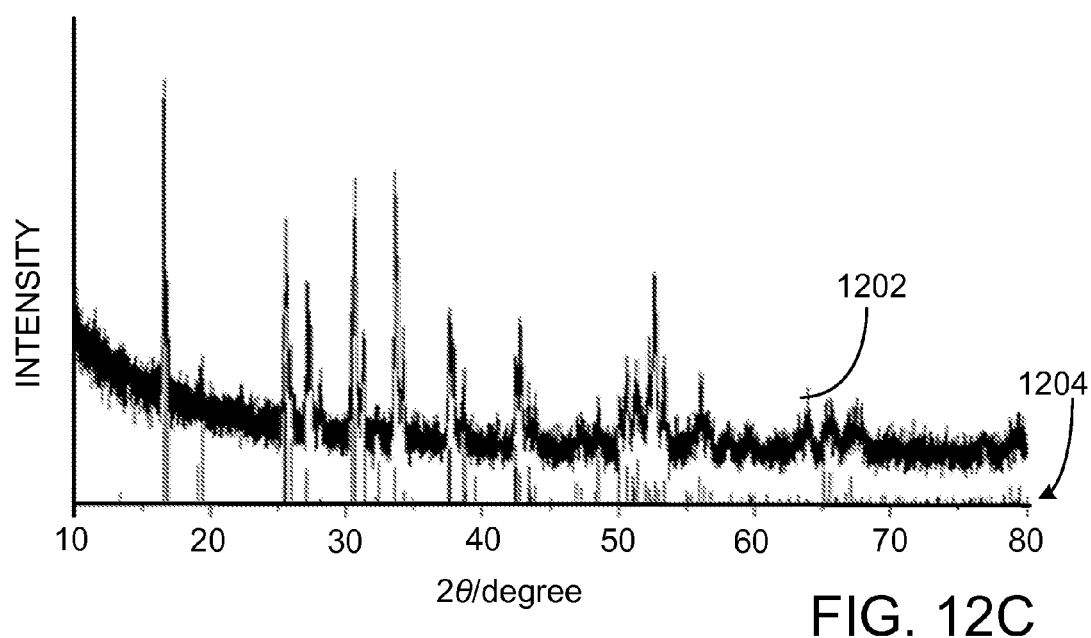
FIG. 12C shows an XRD pattern of calcined LLZO nanowires with sheet-like morphology, with the reference pattern being tetragonal phase LLZO.

The sintering conditions can be varied to tune the properties of the solid electrolyte films. When the heating ramp rate is set to a suitable value, for instance around 2.5 h, the nanowires can partially merge together to form a sheet-like morphology. FIG. 12A shows sheet 1200 formed from merged LLZO nanowires. FIG. 12B is a TEM image showing a piece of the LLZO sheet 1200. FIG. 12C shows the XRD pattern 1202 of LLZO sheets, which matches the reference pattern 1204 for tetragonal phase LLZO.

A number of embodiments of the invention have been described. Nevertheless, it will be understood that various modifications may be made without departing from the spirit and scope of the invention. Accordingly, other embodiments are within the scope of the following claims.

What is claimed is:

1. A solid electrolyte for a lithium-ion battery, the solid electrolyte comprising:
    a film comprising a multiplicity of nanowires, each nanowire comprising a lithium-ion conductive material.
2. The solid electrolyte of claim 1, wherein the film has a thickness ranging from 100 nm to 1 mm.
3. The solid electrolyte of claim 1, wherein the nanowires are amorphous, crystalline, or any combination thereof.
4. The solid electrolyte of claim 1, wherein the multiplicity of nanowires are aligned in the film.
5. The solid electrolyte of claim 1, wherein the multiplicity of nanowires are randomly oriented in the film.
6. The solid electrolyte of claim 1, wherein the lithium-ion conductive material is an oxide comprising lithium.
7. The solid electrolyte of claim 6, wherein the oxide comprising lithium is a perovskite or a garnet-like oxide.
8. The solid electrolyte of claim 7, wherein the oxide comprising lithium is a perovskite, and the perovskite comprises lanthanum and titanium.
9. The solid electrolyte of claim 8, wherein the perovskite has a stoichiometry of $Li_{3x}La_{2/3-x}\square_{1/3-2x}TiO_3$, where $\square$ represents vacancies in the perovskite and $0<x<0.16$.
10. The solid electrolyte of claim 9, wherein the perovskite comprises $Li_{0.3}La_{0.56}TiO_3$.
11. The solid electrolyte of claim 7, wherein the oxide comprising lithium is a garnet-like oxide having a stoichiometry of $Li_xLa_3M_2O_{12}$ (M=Ta, Nb, Zr) or $Li_6ALa_2M_2O_{12}$ (A=Ca, Sr, Ba; M=Nb, Ta).
12. The solid electrolyte of claim 11, wherein the garnet-like oxide comprises $Li_7La_3Zr_2O_{12}$.
13. The solid electrolyte of claim 6, wherein the oxide comprising lithium is $LiNbO_3$.
14. The solid electrolyte of claim 1, wherein the film comprises an additive.
15. The solid electrolyte of claim 1, wherein the film comprises a multiplicity of electro spun nanowires.
16. A lithium-ion battery comprising the solid electrolyte of claim 1.
17. The lithium-ion battery of claim 16, further comprising an anode and a cathode, wherein the film is in direct contact with the anode and the cathode.
18. The solid electrolyte of claim 1, wherein the nanowires are ceramic nanowires.
19. A method of preparing a solid electrolyte for a lithium-ion battery, the method comprising forming a film comprising lithium-ion-conductive nanowires.
20. The method of claim 19, wherein forming the film comprising lithium-ion-conductive nanowires comprises electrospinning a precursor solution comprising nanowires to yield the film.
21. A method of fabricating a lithium-ion battery, the method comprising:
    compressing a solid electrolyte between an anode layer and a cathode layer, wherein the solid electrolyte comprises a film comprising a multiplicity of nanowires, each nanowire comprising a lithium-ion conductive material.
22. A lithium ion battery formed by the method of claim 21.

* * * * *